(12) United States Patent
Ohashi

(10) Patent No.: US 8,149,517 B2
(45) Date of Patent: Apr. 3, 2012

(54) ZOOM LENS UNIT, IMAGING DEVICE AND PORTABLE INFORMATION TERMINAL DEVICE

(75) Inventor: Kazuyasu Ohashi, Funabashi (JP)

(73) Assignee: Ricoh Company, Ltd., Tokyo (JP)

( * ) Notice: Subject to any disclaimer, the term of this patent is extended or adjusted under 35 U.S.C. 154(b) by 167 days.

(21) Appl. No.: 12/766,249

(22) Filed: Apr. 23, 2010

(65) Prior Publication Data

US 2010/0271710 A1   Oct. 28, 2010

(30) Foreign Application Priority Data

Apr. 24, 2009 (JP) ................. 2009-106714
Oct. 29, 2009 (JP) ................. 2009-249192
Feb. 17, 2010 (JP) ................. 2010-033021

(51) Int. Cl.
    *G02B 15/14* (2006.01)
(52) U.S. Cl. ....................... 359/687; 359/686
(58) Field of Classification Search .......... 359/684, 359/685, 686, 687
    See application file for complete search history.

(56) References Cited

U.S. PATENT DOCUMENTS

| | | |
|---|---|---|
| 5,153,779 A | 10/1992 | Ohashi |
| 5,398,135 A | 3/1995 | Ohashi |
| 5,576,891 A | 11/1996 | Ohashi |
| 5,581,319 A | 12/1996 | Ohashi |
| 5,617,254 A | 4/1997 | Ohashi |
| 5,630,188 A | 5/1997 | Ohashi |
| 5,687,401 A | 11/1997 | Kawamura et al. |
| 5,930,056 A | 7/1999 | Ohashi |
| 6,353,506 B1 | 3/2002 | Ohashi |
| 6,525,885 B2 | 2/2003 | Ohashi |
| 6,747,818 B2 | 6/2004 | Ohashi et al. |
| 6,771,433 B2 | 8/2004 | Ohashi |
| 6,829,102 B2 | 12/2004 | Ohashi et al. |
| 6,839,183 B2 | 1/2005 | Ohashi |
| 6,839,185 B2 | 1/2005 | Ohashi |

(Continued)

FOREIGN PATENT DOCUMENTS

CN         101101368 A         1/2008

(Continued)

OTHER PUBLICATIONS

"nd-vd Diagram", In: Hoya: "Optical Glass", XP002593988, Jan. 1, 1997, 1 page (Reference Previously Filed on Jan. 11, 2011, Submitting Clearer Copy).

(Continued)

*Primary Examiner* — David N Spector
(74) *Attorney, Agent, or Firm* — Oblon, Spivak, McClelland, Maier & Neustadt, L.L.P.

(57) ABSTRACT

A zoom lens unit, including in order from an object side to an image side: a first lens group having a positive refracting power; a second lens group having a negative refracting power; a third lens group having a positive refracting power; and a fourth lens group having a positive refracting power, an aperture stop being disposed between the second and the third lens groups, and the third lens group having a positive lens made of an optical glass material which satisfies the following formulae: (1) $1.52 < n_d < 1.62$; (2) $65.0 < v_d < 75.0$; (3) $0.015 < P_{g,F} - (-0.001802 \times v_d + 0.6483) < 0.050$, where, nd represents a refractive index, $v_d$ represents an Abbe number, and Pg,F represents a partial dispersion ratio being defined as follows: $P_{g,F} = (n_g - n_F)/(n_F - n_C)$, where, ng, nF and nC represent refractive indexes for g line, F line and C line, respectively.

20 Claims, 15 Drawing Sheets

U.S. PATENT DOCUMENTS

| | | |
|---|---|---|
| 6,995,921 B2 | 2/2006 | Ohashi |
| 7,038,858 B2 | 5/2006 | Ohashi |
| 7,095,564 B2 | 8/2006 | Ohashi |
| 7,151,638 B2 | 12/2006 | Ohashi |
| 7,164,542 B2 | 1/2007 | Ohashi |
| 7,167,320 B2 | 1/2007 | Ohashi |
| 7,304,803 B2 | 12/2007 | Ohashi |
| 7,379,249 B2 | 5/2008 | Ohashi |
| 7,420,745 B2 | 9/2008 | Ohashi |
| 7,535,650 B2 | 5/2009 | Ohashi |
| 7,535,654 B2 * | 5/2009 | Ohashi .................. 359/690 |
| 7,554,746 B2 | 6/2009 | Ohashi |
| 7,557,839 B2 | 7/2009 | Ohashi |
| 7,580,623 B2 | 8/2009 | Nuno et al. |
| 7,589,910 B2 | 9/2009 | Ohashi |
| 7,663,808 B2 | 2/2010 | Ohashi |
| 2008/0117527 A1 | 5/2008 | Nuno et al. |
| 2008/0204894 A1 | 8/2008 | Ohashi |
| 2009/0080088 A1 | 3/2009 | Ohashi |
| 2010/0007967 A1 | 1/2010 | Ohashi |
| 2010/0027136 A1 | 2/2010 | Ohashi et al. |

FOREIGN PATENT DOCUMENTS

| | | |
|---|---|---|
| JP | 8-248317 | 9/1996 |
| JP | 3391342 | 1/2003 |
| JP | 2004-199000 | 7/2004 |
| JP | 2004-333768 | 11/2004 |
| JP | 2005-326743 | 11/2005 |
| JP | 2006-189598 | 7/2006 |
| JP | 2007-156251 | 6/2007 |
| JP | 2008-26837 | 2/2008 |
| JP | 2008-76493 | 4/2008 |
| JP | 2008-96924 | 4/2008 |
| JP | 2008-112013 | 5/2008 |

OTHER PUBLICATIONS

Office Action issued May 27, 2011 in Chinese Patent Application No. 2010101671880 (with English translation).

Extended Search Report issued Aug. 30, 2010 in EP Application No. 10250799.3.

"Diagram Pgf", In: Schott: "Optisches Glas", XP002593987, Jan. 1, 1981, 1 page.

"Nd-vd Diagram", In: Hoya: "Optical Glass", XP002593988, Jan. 1, 1997, 1 page.

* cited by examiner

ZOOM LENS UNIT, IMAGING DEVICE AND PORTABLE INFORMATION TERMINAL DEVICE

CROSS-REFERENCE TO THE RELATED APPLICATION

The entire contents of Japanese patent applications, No. JP 2009-106714, filed on Apr. 24, 2009, No. JP 2009-249192, filed on Oct. 29, 2009, and No. JP 2010-033021, filed on Feb. 17, 2010, of which the convention priorities are claimed in this application, are incorporated hereinto by reference.

BACKGROUND OF THE INVENTION

1. Field of the Invention

The present invention relates to a zoom lens unit, an imaging device, and a portable information terminal device.

2. Description of the Related Art

In recent years, digital cameras have become popular. The demand of users for digital cameras varies over a wide range. In particular, a user always requires high image quality, and a reduction of size of the camera, and both the high performance and compactness are required for a zoom lens unit which is used as a photographing lens.

From the viewpoint of compactness of a zoom lens unit, it is necessary to shorten a total length of the zoom lens unit (a distance from a lens surface nearest to an object side to an image surface) when using it. In addition, it is important to shorten a thickness of each lens group to reduce a total length of the zoom lens unit when the zoom lens unit is collapsed.

From the viewpoint of high performance of a zoom lens unit, at least a resolution corresponding to an imaging element having 10 to 15 million pixels over all a zoom area is necessary for the zoom lens unit.

In addition, many users require a photographing lens with wide-angle capability, and it is desirable that a half-field angle of a zoom lens unit at a wide-angle end be 38 degrees or more. The half-field angle of 38 degrees corresponds to a focal length of 28 mm in terms of a 35-mm silver salt camera (so-called Leica version).

In addition, a large magnification ratio is preferably desired. A zoom lens unit with a focus length of about 28-200 mm (about 7.1 times) in terms of a 35-mm silver salt camera is considered to be capable of responding to almost all general photographing conditions.

Many kinds of zoom lens units for a digital camera are possible. As a kind of zoom lens unit which is suitable for a high magnification ratio, the following zoom lens unit is known, which includes, in order from an object side to an image side, a first lens group having a positive focal length; a second lens group having a negative focal length; a third lens group having a positive focal length; and a fourth lens group having a positive focal length, and when changing magnification from a wide-angle end to a telephoto end, an interval between the first lens group and the second lens group increases, an interval between the second lens group and the third lens group decreases, and an interval between the third lens group and the fourth lens group varies.

As this kind of zoom lens unit, when changing magnification, the first lens group can be fixed or reciprocate with a convex trajectory to the image side. If it is attempted to secure a great displacement of the second lens group which bears a major changing magnification function, an aperture stop disposed in the neighborhood of the third lens group moves away from the first lens group even at the wide-angle end, and a size of the first lens group tends to increase when attempting to obtain a wide angle and high magnification ratio.

With the above-mentioned kind of zoom lens unit, to obtain a compact zoom lens unit with a wide angle and a high magnification ratio, it is preferable that the first lens group be moved such that the first lens group locates nearer to the object side at the telephoto end than at the wide-angle end, to change the magnification. Thus, by shortening the total length of the zoom lens unit at the wide-angle end comparing with that at the telephoto end, it is possible to reduce an increase in size of the first lens group while obtaining a sufficient wide angle.

Chromatic aberration is easy to generate associating with a high magnification ratio and long focus length, and it is well-known that utilization of a lens with anomalous dispersibility is effective for correction of the chromatic aberration.

JP H08-248317 A, JP 3391342 B, JP 2004-333768 A and JP 2008-026837 A propose a zoom lens unit that employs a lens with anomalous dispersibility in the above-mentioned kind of zoom lens unit.

In a zoom lens unit disclosed in JP H08-248317 A, a half-field angle at a wide-angle end is 25 degrees. In an example of a zoom lens unit constituting of four lens groups having positive/negative/positive/positive refracting power, disclosed in JP 3391342 B, a half-field angle at a wide-angle end is about 29 to 32 degrees. These zoom lens units disclosed in JP H08-248317 A and JP 3391342 B are not ones that sufficiently satisfy the request nowadays in the point of a wide angle.

A zoom lens unit disclosed in JP 2004-333768 A has a wide angle, in which a half-field angle at a wide-angle end is about 37 degrees, but as a whole the zoom lens unit constituting many lenses, as many as 14 lenses, leads to problems of shortening of a total length of the zoom lens unit when collapsed and decreasing cost.

In a zoom lens unit disclosed in JP 2008-026837 A, a wide angle and high magnification ratio have been achieved with a relatively simple structure, however a total length of the zoom lens unit at a telephoto end is longish, therefore there is still room for improvement in reduction of size of the zoom lens unit.

SUMMARY OF THE INVENTION

Therefore, at least an object of the present invention is to provide, for example, a zoom lens unit of which a half-field angle at a wide-angle end is 38 degrees or more, and a magnification ratio is 6.5 times or more, achieved by as few lenses as about 10 lenses, which is compact and has a resolution corresponding to an imaging element having 10 million to 15 million pixels.

At least another object of the present invention is to provide an imaging device, a portable information terminal device including the zoom lens unit mentioned above.

In light of the above mentioned, the present invention proposes, for example, a zoom lens unit, including in order from an object side to an image side: a first lens group having a positive refracting power; a second lens group having a negative refracting power; a third lens group having a positive refracting power; and a fourth lens group having a positive refracting power, an aperture stop being disposed between the second lens group and the third lens group, and when changing magnification from a wide-angle end to a telephoto end, an interval between the first lens group and the second lens group increases, an interval between the second lens group and the third lens group decreases, an interval between the third lens group and the fourth lens group increases, and the first lens group and the third lens group are moved such that the first lens group and the third lens group locate nearer to the object side at the telephoto end than at the wide-angle end, wherein the third lens group has a positive lens made of an optical glass material which satisfies the following formulae:

$$1.52 < nd < 1.62 \quad (1)$$

$$65.0 < vd < 75.0 \quad (2)$$

$$0.015 < Pg,F - (-0.001802 \times vd + 0.6483) < 0.050 \quad (3)$$

where, nd represents a refractive index of the optical glass material, $v_d$ represents an Abbe number of the optical glass material, and Pg,F represents a partial dispersion ratio of the optical glass material, the partial dispersion ratio, Pg,F, being defined as follows:

$$Pg,F = (ng - nF)/(nF - nC)$$

where, ng, nF and nC represent refractive indexes of the optical glass material for g line, F line and C line, respectively.

The present invention further proposes, for example, a zoom lens unit including in order from an object side to an image side: a first lens group having a positive refracting power; a second lens group having a negative refracting power; a third lens group having a positive refracting power; and a fourth lens group having a positive refracting power, and when changing magnification from a wide-angle end to a telephoto end, an interval between the first lens group and the second lens group increases, an interval between the second lens group and the third lens group decreases, an interval between the third lens group and the fourth lens group increases, and the first lens group and the third lens group are moved such that the first lens group and the third lens group locate nearer to the object side at the telephoto end than at the wide-angle end, wherein an aperture stop is disposed between the second lens group and the third lens group, and wherein the first lens group has a positive lens made of an optical glass material, and the positive lens of the first lens group satisfies the following formulae:

$$1.52 < nd < 1.62 \quad (21)$$

$$65.0 < vd < 75.0 \quad (22)$$

$$0.015 < Pg,F - (-0.001802 \times vd + 0.6483) < 0.050 \quad (23)$$

where, nd represents a refractive index of the optical glass material forming the positive lens, $v_d$ represents an Abbe number of the optical glass material forming the positive lens, and Pg,F represents a partial dispersion ratio of the optical glass material forming the positive lens, the partial dispersion ratio, Pg,F, being defined as follows:

$$Pg,F = (ng - nF)/(nF - nC)$$

where, ng, nF and nC represent refractive indexes of the optical glass material forming the positive lens for g line, F line and C line, respectively.

The present invention further proposes, for example, an imaging device and a portable information terminal device which use any one of the above-mentioned zoom lens units as a photographing optical system.

BRIEF DESCRIPTION OF THE DRAWINGS

The invention will be described further below with reference to embodiments and the accompanying schematic drawings, in which.

DETAILED DESCRIPTION OF THE PREFERRED EMBODIMENTS

Figure 1:
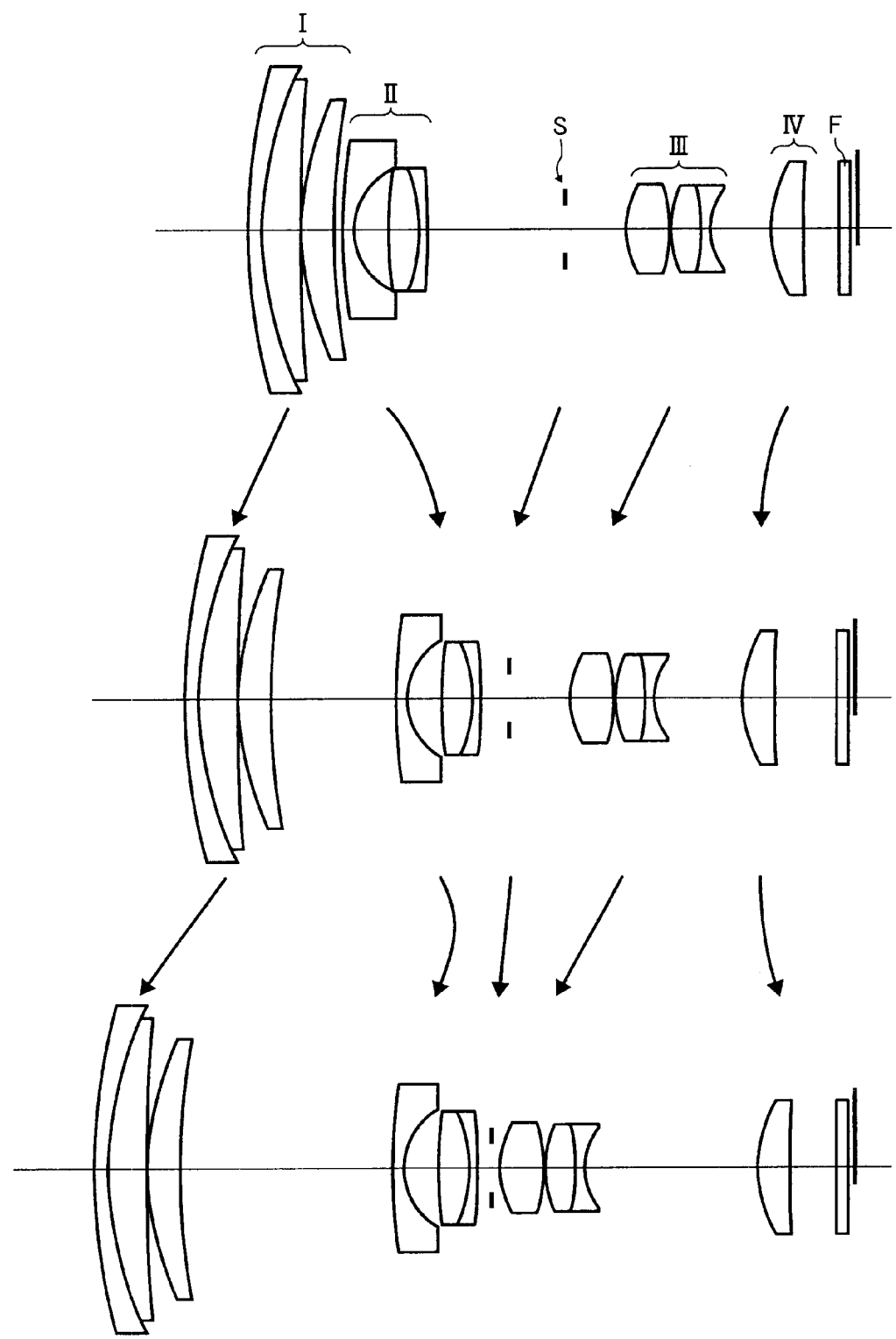
FIG. 1 is a sectional view illustrating a structure of a zoom lens unit according to Example 1 of the invention.

In an embodiment of the present invention, for example, in embodiments 1 to 5 explained later, a zoom lens unit includes, in order from an object side to an image side: a first lens group having a positive refracting power; a second lens group having a negative refracting power; a third lens group having a positive refracting power; and a fourth lens group having a positive refracting power, an aperture stop being disposed between the second lens group and the third lens group, and when changing magnification from a wide-angle end to a telephoto end, an interval between the first lens group and the second lens group increases, an interval between the second lens group and the third lens group decreases, an interval between the third lens group and the fourth lens group increases, and the first lens group and the third lens group are moved such that the first lens group and the third lens group locate nearer to the object side at the telephoto end than at the wide-angle end.

In addition, the third lens group of the zoom lens unit has a positive lens made of an optical glass material which satisfies the following formulae:

$$1.52 < nd < 1.62 \quad (1)$$

$$65.0 < vd < 75.0 \quad (2)$$

$$0.015 < Pg,F - (-0.001802 \times vd + 0.6483) < 0.050 \quad (3)$$

where, nd represents a refractive index of the optical glass material forming the positive lens, $v_d$ represents an Abbe number of the optical glass material forming the positive lens, and Pg,F represents a partial dispersion ratio of the optical glass material forming the positive lens.

The above-mentioned partial dispersion ratio, Pg,F, is defined as follows:

$$Pg,F = (ng - nF)/(nF - nC)$$

where, ng, nF and nC represent refractive indexes of the above-mentioned optical glass material forming the positive lens for g line, F line and C line, respectively.

In another embodiment of the present invention, a zoom lens unit includes, in order from an object side to an image side: a first lens group having a positive refracting power; a second lens group having a negative refracting power; a third lens group having a positive refracting power; a fourth lens group having a positive refracting power; and a fifth lens group having a positive or a negative refracting power, an aperture stop being disposed between the second lens group and the third lens group, and when changing magnification from a wide-angle end to a telephoto end, an interval between the first lens group and the second lens group increases, an interval between the second lens group and the third lens group decreases, an interval between the third lens group and the fourth lens group increases, and the first lens group and the third lens group are moved such that the first lens group and the third lens group locate nearer to the object side at the telephoto end than at the wide-angle end, in addition, the third lens group has a positive lens made of the optical glass material satisfying the formulae (1) to (3).

For the optical glass material satisfying the formulae (1) to (3) which forms the positive lens of the third lens group, together with the formulae (1) to (3), it is preferable that the following formula be satisfied:

$$30 < FA < 500 \quad (4)$$

where, FA represents a degree of wear of the optical glass material which will be explained later.

In addition, it is preferable that the zoom lens unit satisfy the following formula:

$$1.0 < fap/fW < 2.0 \quad (5)$$

where, fap represents a focal length of the positive lens of the third lens group which is made of the optical glass material satisfying the formulae (1) to (3), fW represents a focal length of the entire zoom lens unit system at the wide-angle end.

The third lens group of the above-mentioned zoom lens unit can be constituted such that the third lens group includes at least two positive lenses and one negative lens, and one of the at least two positive lenses has an aspheric surface.

In this case, the positive lens having the aspheric surface can be made of an optical glass material which does not satisfy the formulae (1) to (3), or the optical glass material satisfying the formulae (1) to (3).

In a further embodiment of the present invention, the third lens group of the zoom lens unit has at least one negative lens, and one of the at least one negative lens with a concave surface having stronger curvature toward the image side is disposed nearest to the image side of the third lens group. It is preferable that the zoom lens unit satisfy the following formula:

$$0.6 < |r3R|/fW < 1.3 \quad (6)$$

where, r3R represents a curvature radius of the concave surface with stronger curvature on the image side of the negative lens, and fW represents a focal length of the entire zoom lens unit system at the wide-angle end.

It is preferable that the zoom lens unit satisfy the following formula:

$$0.20 < X1/fT < 0.45 \quad (7)$$

where, X1 represents a total displacement of the first lens group when changing magnification from the wide-angle end to the telephoto end, and fT represents a focal length of the entire zoom lens unit system at the telephoto end.

It is preferable that the zoom lens unit satisfy the following formula:

$$0.15 < X3/fT < 0.40 \quad (8)$$

where, X3 represents a total displacement of the third lens group when changing magnification from the wide-angle end to the telephoto end, and fT represents a focal length of the entire zoom lens unit system at the telephoto end.

It is preferable that the zoom lens unit satisfy the following formula:

$$0.50 < |f2|/f3 < 0.85 \quad (9)$$

$$5.0 < f1/fW < 8.0 \quad (10)$$

where, f1 represents a focal length of the first lens group, f2 represents a focal length of the second lens group, f3 represents a focal length of the third lens group, and fW represents a focal length of the entire zoom lens unit system at the wide-angle end.

In a further embodiment of the present invention, a zoom lens unit includes, in order from an object side to an image side: a first lens group having a positive refracting power; a second lens group having a negative refracting power; an aperture stop; a third lens group having a positive refracting power; and a fourth lens group having a positive refracting power, and when changing magnification from a wide-angle end to a telephoto end, an interval between the first lens group and the second lens group increases, an interval between the second lens group and the third lens group decreases, an interval between the third lens group and the fourth lens group increases, and the first lens group and the third lens group are moved such that the first lens group and the third lens group locate nearer to the object side at the telephoto end than at the wide-angle end.

In addition, the third lens group has a positive lens made of the optical glass material satisfying the formulae (1) to (3).

$$1.52 < nd < 1.62 \quad (1)$$

$$65.0 < vd < 75.0 \quad (2)$$

$$0.015 < Pg,F-(-0.001802 \times vd + 0.6483) < 0.050 \quad (3)$$

where, nd represents a refractive index of the optical glass material, vd represents an Abbe number of the optical glass material, and Pg,F represents a partial dispersion ratio of the optical glass material.

The partial dispersion ratio, Pg,F, is defined as follows:

$$Pg,F = (ng-nF)/(nF-nC)$$

where, ng, nF and nC represent refractive indexes of the optical glass material for g line, F line and C line, respectively.

Thus, such a zoom lens unit is possible in which at least one additional lens group can be arranged on an image side of a fourth lens group of the zoom lens unit which has the structure of four lens groups of the above-mentioned zoom lens unit as a minimum necessary lens group structure.

An imaging device according to the present invention includes any one of the above-mentioned zoom lens units as a photographing optical system, the imaging device can be constituted as a silver salt camera, and it is preferable that the imaging device be constituted as a digital camera.

A portable information terminal device of the present invention includes any one of the above-mentioned zoom lens units as a photographing optical system of a camera function part. In addition, the above-mentioned imaging device can be used as the camera function part.

In a zoom lens unit which includes four lens groups having positive/negative/positive/positive refracting power, generally, a second lens group is constructed as a so-called variator to bear a major changing magnification function. However, in the present invention, the third lens group is configured to share the changing magnification function; accordingly, flexible correction to aberration corrections which become difficult with a wide angle and a high magnification ratio can be secured, by reducing the load of the second lens group.

When changing magnification from the wide-angle end to the telephoto end, by moving the first lens group to the object side greatly, at the wide-angle end the height of a ray which passes through the first lens group is reduced, thus an increase in size of the first lens group associated with a wide angle can be reduced, and at the telephoto end the interval between the first lens group and the second lens group is secured to be large, and this is advantageous for the long focus length.

That is to say, when changing magnification from the wide-angle end to the telephoto end, an interval between the first lens group and the second lens group increases, and an interval between the second lens group and the third lens group decreases, and magnification (absolute values) of an image through the second lens group and magnification (absolute values) of an image through the third lens group increase, and the changing magnification function is shared mutually.

For a zoom lens unit according to the present invention which achieves a high magnification ratio, correction of "secondary spectrum of axial chromatic aberration at a telephoto end" becomes difficult when a long focal length of the telephoto end is especially desired.

In addition, correction of "secondary spectrum of chromatic aberration of magnification at a wide-angle end" becomes difficult when it is desired to shorten a focal length of the wide-angle end and obtain a wide angle.

In the zoom lens unit according to the present invention, an anomalous dispersion material (a material with high anomalous dispersibility) is used to correct the axial chromatic aberration at the telephoto end and the chromatic aberration of magnification at the wide-angle end and their secondary spectrum. Application places and optical properties of the anomalous dispersion material are quite important.

In general, to reduce the secondary spectrum of axial chromatic aberration, if special low-dispersion glass is used for a lens group with high height of light on the axis, the effect is great.

Height of light on the axis of the third lens group is only lower than that of the first lens group among the lens groups; therefore, by employing special low-dispersion glass in the third lens group, it becomes possible to decrease the second spectrum of axial chromatic aberration sufficiently.

However, usually a refractive index of the special low-dispersion glass is low, and thus correction ability of monochromatic aberration can easily drop. Therefore, when forming the third lens group with few lenses and trying to decrease the monochromatic aberration and the chromatic aberration in a balanced manner, a sufficient effect is not always achieved by the use of the low-dispersion glass.

In the present invention, the at least one positive lens in the third lens group is made of an optical glass material of which a refractive index, an Abbe number and anomalous dispersibility are within a range satisfying the formulae (1) to (3), and even if the third lens group has few lenses, such as three lenses, it is possible to decrease the second spectrum of chromatic aberration, and sufficient correction of the monochromatic aberration is possible.

If the refractive index of the above-mentioned optical glass material, nd, is 1.52 or less, the correction of the monochromatic aberration becomes insufficient. If the Abbe number, vd, is 65.0 or less, the correction of the chromatic aberration becomes insufficient. If the parameter of the formula (3) is 0.015 or less, the correction of the second spectrum of chromatic aberration becomes insufficient.

An optical glass material of which parameters exceed the upper limits of these formulae (1) to (3) does not exist, or it is very special and expensive even if the optical glass material exists, and it is not realistic to use such the optical glass material as a lens material.

The formula (4) about a degree of wear, FA, which is preferable to be satisfied for the optical glass material satisfying the formulae (1) to (3) and forming the positive lens of the third lens group, will be explained hereinafter.

The degree of wear, FA, is calculated by the following formula:

$$FA = \{(m/d)/(m0/d0)\} \times 100,$$

where, m represents a wear loss when a sample having a 9 $cm^2$ measurement area is kept at a fixed position which is 80 mm away from a center of a cast-iron plane plate which rotates at 60 rpm in a horizontal plane, and supplied with a lapping fluid in which 20 ml water is added to 10 g of alumina abrasive grain with a 20 μm average size uniformly for 5 minutes, and is lapped whilst applying with a load of 9.807 N, m0 represents a wear loss when a standard specimen (BSC7) specified by the Japanese Optical Glass Manufacture's Association is lapped under the same conditions as above-mentioned, d represents a density of the sample, and d0 represents a density of the standard specimen.

The degree of wear increases as the wear loss, m, gets larger, or the density, d, gets smaller.

Generally, most optical materials which have a relatively low dispersion and anomalous dispersibility, have a large degree of wear. Especially, for the optical glass material with a degree of wear exceeding 500, such problems arise that it is difficult to achieve high accuracy in "lens processing processes such as grinding, centration, and washing", and it is easy to be damaged, and it is a factor of drop-off in quality and an increase of cost by a low degree of yield ratio.

Forming the positive lens of the third lens group with the optical glass material which satisfies the formulae (1) to (3) and has the degree of wear less than 500 is very important for maintaining a high quality of the zoom lens unit with low-cost.

If the degree of wear of such an optical glass material is smaller than 30, a long time is necessary to grind the optical glass material because the optical glass material is difficult to be worn away, thus efficiency of lens manufacture is decreased, and it is a factor of an increase of cost.

The formula (5) which is preferable to be satisfied for at least one of the positive lenses of the third lens group which is made of the optical glass material satisfying the formulae (1) to (3), will be explained hereinafter.

If the parameter of the formula (5), fap/fW, is larger than 2.0, a refracting power of a lens using an anomalous dispersion material is not sufficiently to reduce a second spectrum sufficiently, and may result in an insufficient correction of chromatic aberration.

In contrast, if the parameter fap/fW is smaller than 1.0, it becomes difficult to achieve a balance of correction of chromatic aberration and correction of spherical aberration. Moreover, it becomes disadvantageous in processing accuracy due to a curvature of each surface of the positive lens increasing.

It is preferable to use an aspheric surface for correction of spherical aberration at a place near the aperture stop. In contrast, it is possible to obtain an effect of decreasing the secondary spectrum of not only the axial chromatic aberration but also the chromatic aberration of magnification, by keeping a lens using the anomalous dispersion material away from the aperture stop to some extent.

Based on this viewpoint, in a case that the third lens group includes at least two positive lenses and one negative lens, one reasonable structure is such that an aspheric lens not satisfying the formulae (1) to (3) is used as one of the at least two positive lenses arranged nearer to the aperture stop, and a lens using an anomalous dispersion material is used as another positive lens of the at least two positive lenses arranged far away from the aperture stop.

As above-mentioned the third lens group is an important lens group which shares the changing magnification function with the second lens group, and plays a role of imaging, and a sufficient aberration correction becomes possible by employing the above-mentioned structure.

In addition, if the aperture stop which is disposed on an object side of the third lens group is left away from the third lens group to some extent at least at the wide-angle end, even in a case that the positive lens nearest to the aperture stop is made from the anomalous dispersion material, it is possible to obtain an effect of decreasing secondary spectrum of not only the axial chromatic aberration but also the chromatic aberration of magnification.

Moreover, most of the optical glass materials which have the low dispersion and the anomalous dispersibility have a relatively low transition point, Tg, and can be molded with a low temperature, therefore they are suitable for manufacture of an aspheric lens with glass mold technology.

Therefore, it is also one reasonable structure for the third lens group that an aspheric lens using an anomalous dispersion material satisfying the formulae (1) to (3) is used as one of the two positive lenses of the third lens group which is arranged nearer to the aperture stop.

The third lens group is an important lens group which has both the changing magnification function and the imaging roles as mentioned above, and a sufficient aberration correction becomes possible by employing this structure.

In addition, even in a case that the lens using the anomalous dispersion material is produced with the glass mold technology, "cold processing such as grinding" is necessary in most cases to form a preform which is a base material before shape forming, and the degree of wear of the material is important, same as before.

The formula (6) is a condition for obtaining a further excellent aberration correction.

If the parameter of the formula (6), |r3R|/fW, is smaller than 0.6, the spherical aberration is easy to be corrected excessively. If |r3R|/fW is larger than 1.3, the spherical aberration is easy to be corrected insufficiently.

If the parameter of the formula (6) is outside the above-mentioned scope, it is difficult to achieve a balance of comatic aberration as well as the spherical aberration, and it is easy to generate extroversion or introversion comatic aberration at an off-axis peripheral area.

If the parameter of the formula (7), X1/fT, is lower than 0.20, a displacement of the first lens group accompanied with the changing magnification is too small, and the contribution to the changing magnification of the second lens group decreases. And the burden of the third lens group for the changing magnification increases, or the refracting powers of the first lens group and the second lens group have to be strengthened, resulting in the deterioration in various aberrations in either case.

In addition, the total length of the entire zoom lens unit at the wide-angle end is increased in length, and the height of light passing the first lens group increases, causing the increase in size of the first lens group.

On the other hand, if the parameter, X1/fT is larger than 0.45, a displacement of the first lens group accompanied with the changing magnification is too great, the total length at the wide-angle end becomes too short, or the total length at the telephoto end becomes too long. If the total length at the wide-angle end becomes too short, the moving space of the third lens group is limited, and the contribution to the changing magnification of the third lens group is reduced. Therefore, it becomes difficult to correct the entire aberrations.

If the total length of the entire zoom lens unit at the telephoto end becomes too long, not only is the reduction of size in the total length direction disturbed, but also the radial direction grows in size for securing the peripheral light volume at the telephoto end, and the image performance is also easily deteriorated by a manufacturing error such as dropping of the lens barrel.

It is more preferable for the parameter of the formula (7), X1/fT to satisfy the following formula:

$$0.25 < X1/fT < 0.40. \tag{7A}$$

If the parameter of the formula (8), X3/fT is smaller than 0.15, a displacement of the third lens group accompanied with the changing magnification becomes small, the contribution to the changing magnification of the third lens group is reduced, and the burden of the second lens group is increased, or the refracting power of the third lens group itself has to be strengthened, resulting in the deterioration in various aberrations in either case.

On the other hand, if the parameter, X3/fT is larger than 0.40, the total length of the entire zoom lens unit at the wide-angle end is increased, and the height of light passing the third lens group increases, causing the increase in size of the third lens group.

It is more preferable for the parameter of the formula (8), X3/fT to satisfy the following formula:

$$0.20 < X3/fT < 0.35. \tag{8A}$$

If the parameter of the formula (9), |f2|/f3 is lower than 0.50, the refracting power of the second lens group becomes too strong; if the parameter, |f2|/f3 is larger than 0.85, the refracting power of the third lens group becomes too strong. Therefore, outside the scope of the formula (9), the aberration fluctuation when changing magnification increases easily.

If the parameter of the formula (10), f1/fW is lower than 5.0, it is advantageous for a high magnification ratio because the imaging magnification of the second lens group comes close to the same magnification, and the changing magnification efficiency increases. However, the large refracting power is required for each lens in the first lens group, and a negative effect such as the deterioration in the chromatic aberration especially at the telephoto end is easily produced. In addition, each lens in the first lens group is increased in thickness and diameter, and it is disadvantageous to the reduction of the size in a collapsed state.

If the parameter of the formula (10), f1/fW is larger than 8.0, the contribution to the changing magnification of the second lens group is reduced, and it becomes difficult to obtain a high magnification ratio.

In the zoom lens unit according to the present invention, the aperture stop is disposed between the second and the third lens groups, and can be moved independently of the neighboring lens groups.

With this structure, the most suitable light path can be selected in any position of the large changing magnification area of 6.5 times or more. Accordingly, the flexibility of corrections such as, comatic aberration and field curvature can be improved, and also the off-axis performance can be improved.

It is preferable for the interval between the aperture stop and the third lens group at the wide-angle end to be wider than that at the telephoto end. By the third lens group which uses an anomalous dispersion material satisfying the formulae (1)-(3) being left away from the aperture stop at the wide-angle end, and coming closer to the aperture stop at the telephoto end, the anomalous dispersibility effectively acts on "correction of secondary spectrum of the chromatic aberration of magnification at the wide-angle end", and acts on "correction of secondary spectrum of the axial chromatic aberration at the telephoto end" effectively.

Therefore, it is possible to correct the chromatic aberration better over the entire magnification area. In addition it is possible that the aperture stop is moved nearer to the first lens group at the wide-angle end and the height of light passing the first lens group is decreased; therefore, the size of the first lens group can be further reduced.

Therefore, in a case that the interval between the aperture stop and the third lens group at the wide-angle end is set to be wider than that at the telephoto end, it is preferable that the following formula be satisfied:

$$0.05 < dsw/fT < 0.20, \tag{11}$$

where, dsw represents an axial distance between the aperture stop and a lens surface nearest to the object side of the third lens group, at the wide-angle end, and fT represents a focal length of the entire zoom lens unit system at the telephoto end.

If the parameter of the formula (11), dsw/fT is smaller than 0.05, the height of light passing the third lens group becomes small at the wide-angle end, and thus an effective reduction of secondary spectrum of the chromatic aberration of magnification at the wide-angle end becomes difficult. In addition, the height of light passing the first lens group becomes too large at the wide-angle end, causing the increase in size of the first lens group.

If the parameter, dsw/fT is larger than 0.20, the height of light passing the third lens group at the wide-angle end becomes large. Thereby, the image plane falls to the over side, and the barrel shaped distortion increases. Especially, it becomes difficult to secure the performance at the wide field angle.

It is preferable that the first lens group include at least one negative lens and at least one positive lens from the object side. Especially, it is preferable that the first lens group include a structure of two lenses in which, arranged in order from the object side, one negative meniscus lens with a convex surface toward the object side and one positive lens with a stronger convex surface toward the object side are arranged, or a structure of three lenses in which, arranged in order from the object side, one negative meniscus lens with a convex surface toward the object side, one positive lens with a stronger convex surface toward the object side and one positive lens with a stronger convex surface toward the object side.

To achieve a high magnification ratio especially to make a focus length of the telephoto end longer, it is necessary to increase "combination magnification of the second lens group, the third lens group, and the fourth lens group" at the telephoto end, and the aberration generated in the first lens group is enlarged on the image plane accordingly.

Therefore, it is necessary to reduce an "amount of aberration generated in the first lens group" small enough to achieve a high magnification ratio, and thus it is preferable to form the first lens group with the above-mentioned structure.

It is preferable that the second lens group include a structure of three lenses in which, arranged in order from the object side, one negative lens with a surface having greater curvature toward the image side, one positive lens with a surface having greater curvature toward the image side and one negative lens with a surface having greater curvature toward the object side are disposed.

It is well-known that a magnification lens group with negative refracting power which has a three-lens structure includes, in order from an object side, a negative lens, a negative lens and a positive lens. Comparing to this well-known structure, the above-mentioned structure of the second lens group is further excellent in "correction ability of the chromatic aberration of magnification associated with a wide angle". And the second and the third lenses from the object side can be cemented appropriately.

It is preferable that each lens of the second lens group satisfy the following formulae.

$$1.75 < N_{21} < 2.10,\ 25 < \nu_{21} < 55 \tag{12}$$

$$1.75 < N_{22} < 2.10,\ 15 < \nu_{22} < 35 \tag{13}$$

$$1.75 < N_{23} < 2.10,\ 25 < \nu_{23} < 55 \tag{14}$$

where, $N_{2i}$, $\nu_{2i}$ (i=1 to 3) represent a refractive index and Abbe number of a lens i counted from the object side in the second lens group, respectively.

By selecting a kind of glass that satisfies such formulae, "further excellent correction of the chromatic aberration with the monochromatic aberration being reduced sufficiently small" becomes possible.

It is preferable for the third lens group to include three lenses arranged in order from the object side: a positive lens, a positive lens and a negative lens, and the second lens and the third lens from the object side can be cemented appropriately.

The fourth lens group in the zoom lens unit of the present invention chiefly has functions of "securement of a distance of an exit pupil (telecentric property)" and "focusing by a movement of the fourth lens group". For a reduction of size of the zoom lens unit, it is better that the fourth lens group have as simple a structure as possible, and it is preferable that the fourth lens group consist of one positive lens.

In order to advance the reduction of the size while maintaining good aberration correction, it is necessary to adopt an aspheric surface, and in the present invention, it is preferable for at least the second lens group and the third lens group to have one aspheric surface or more, respectively.

Especially in the second lens group, if both of the surface nearest to the object side and the surface nearest to the image side are aspheric surfaces, a high effect for the corrections of the distortion aberration, the astigmatism and the like which increase with the wide angle, can be obtained.

As the aspheric lens, a molded optical glass material and molded optical plastic material (glass mold aspheric surface and plastic mold aspheric lens), a glass lens having a lens surface on which a thin resin layer is molded and whose lens surface is formed to be an aspheric surface (described as hybrid aspheric surface, replica aspheric surface or the like) and the like can be used.

In order to simplify the mechanism, it is better for the opening diameter of the aperture stop to be constant regardless of the changing magnification. However, the change in F number associated with the changing magnification can be reduced by increasing the opening diameter at the long focal length end with respect to the short focal length end.

In addition, if it is necessary to reduce the light volume which reaches the image plane, the diameter of the aperture stop can be reduced. However, it is preferable to insert an ND filter and the like without significantly changing the diameter of the aperture stop so as to reduce the light volume because the resolution deterioration by a diffraction phenomenon can be prevented.

In addition, the zoom lens unit of the present invention is not limited to a structure of four lens groups. At least one lens group, for example, a fifth lens group with a positive refracting power or a negative refracting power can be arranged on the image side of the fourth lens group, to increase a degree of freedom for correcting aberrations and securing performance of the zoom lens unit. Further, there is still room for arranging a sixth lens group on the image side.

In a further embodiment of the present invention, for example, in the Embodiments 2 to 5 explained later, a zoom lens unit includes, in order from an object side to an image side: a first lens group having a positive refracting power; a second lens group having a negative refracting power; a third lens group having a positive refracting power; and a fourth lens group having a positive refracting power, and when changing magnification from a wide-angle end to a telephoto end, an interval between the first lens group and the second lens group increases, an interval between the second lens group and the third lens group decreases, an interval between the third lens group and the fourth lens group increases, and the first lens group and the third lens group are moved such that the first lens group and the third lens group locate nearer to the object side at the telephoto end than at the wide-angle end.

In addition, an aperture stop is disposed between the second lens group and the third lens group, and the first lens group of the zoom lens unit has a positive lens made of an optical glass material which satisfies the following formulae:

$$1.52 < nd < 1.62 \quad (21)$$

$$65.0 < vd < 75.0 \quad (22)$$

$$0.015 < Pg,F - (-0.001802 \times vd + 0.6483) < 0.050 \quad (23)$$

where, nd represents a refractive index of the optical glass material forming the positive lens, $v_d$ represents an Abbe number of the optical glass material forming the positive lens, and Pg,F represents a partial dispersion ratio of the optical glass material forming the positive lens.

The above-mentioned partial dispersion ratio, Pg,F, is defined as follows:

$$Pg,F = (ng - nF)/(nF - nC)$$

where, ng, nF and nC represent refractive indexes of the above-mentioned optical glass material forming the positive lens for g line, F line and C line, respectively.

Correction of secondary spectrum of axial chromatic aberration at a telephoto end becomes difficult if a high magnification ratio and especially a long focal length of the telephoto end are desired. In addition, correction of secondary spectrum of chromatic aberration of magnification at a wide-angle end becomes difficult when it is desired to shorten a focal length of the wide-angle end and obtain a wide angle.

In the Embodiments 2 to 5 explained later, an anomalous dispersion material (a material with high anomalous dispersibility) is used to correct these chromatic aberrations. Optical properties of the anomalous dispersion material are quite important.

In general, to reduce the secondary spectrum of axial chromatic aberration, if special low-dispersion glass is used for a lens group with high height of light on the axis, the effect is great. In particular, at least at the telephoto end the height of light on the axis of the first lens group is largest; therefore, by employing the special low-dispersion glass in the first lens group, it becomes possible to decrease the second spectrum of axial chromatic aberration sufficiently. However, usually a refractive index of the special low-dispersion glass is low, and thus correction ability of monochromatic aberration is easily reduced. Therefore, when forming the first lens group with few lenses and trying to decrease the monochromatic aberration and the chromatic aberration in a balanced manner, sufficient effect is not always achieved by the use of the special low-dispersion glass.

In each of zoom lens units of the Embodiments 2 to 5 explained later, the at least one positive lens in the first lens group is made of the optical glass material of which the refractive index, the Abbe number and the anomalous dispersibility are within ranges satisfying the formulae (21) to (23) respectively. Thus, even if the first lens group has few lenses, such as three lenses or less, it is possible to decrease the second spectrum of chromatic aberration, and sufficient correction of the monochromatic aberration is possible.

If the refractive index of the optical glass material, nd, is 1.52 or less, the correction of the monochromatic aberration becomes insufficient. If the Abbe number, vd, is 65.0 or less, the correction of the chromatic aberration becomes insufficient. If the parameter of the formula (23), Pg,F−(−0.001802×vd+0.6483), is 0.015 or less, the correction of the second spectrum of chromatic aberration becomes insufficient.

An optical glass material of which parameters exceed the upper limits of these formulae (21) to (23) does not exist, or it is very special and expensive even if the optical glass material exists, and it is not realistic to use such the optical glass material as a lens material.

In each of the zoom lens units of the Embodiments 2 to 5 explained later, it is preferable for the optical glass material satisfying the formulae (21) to (23) and forming the positive lens of the first lens group that the formula (24) about a degree of wear, FA, to be satisfied:

$$30 < FA < 500 \tag{24}$$

Generally, most optical materials, which have a relatively low dispersion and have anomalous dispersibility, have a large degree of wear. Especially, for the optical glass material with a degree of wear exceeding 500, such problems arise that it is difficult to achieve high accuracy in lens processing processes such as grinding, centration, and washing, and it is easy to be damaged, and it is a factor of drop-off in quality and an increase of cost by a low degree of yield ratio.

Forming the positive lens of the first lens group with the optical glass material which satisfies the formulae (21) to (23) and has the degree of wear less than 500 is very important for maintaining a high quality of the zoom lens unit with low-cost. If the degree of wear is smaller than 30, a long time is necessary to grind the optical glass material, it is a factor of an increase of cost and is undesirable.

In addition, the degree of wear, FA, is calculated by the following formula:

$$FA = \{(m/d)/(m0/d0)\} \times 100, \tag{24'}$$

where, m represents a wear loss when a sample having a 9 cm² measurement area is kept at a fixed position which is 80 mm away from a center of a cast-iron plane plate which rotates at 60 rpm in a horizontal plane, and supplied with a lapping fluid in which 20 ml water is added to 10 g of alumina abrasive grain with a 20 μm average size uniformly for 5 minutes, and is lapped whilst applying with a load of 9.807 N,
m0 represents a wear loss when a standard specimen (BSC7) specified by the Japanese Optical Glass Manufacture's Association is lapped under the same conditions as above-mentioned,
d represents a density of the sample, and d0 represents a density of the standard specimen.

In addition, in each of the zoom lens units of the Embodiments 2 to 5 explained later, it is preferable for at least one of the positive lens made of the optical glass material which satisfies the formulae (21) to (23), of the first lens group, has a refracting power satisfying the following formula:

$$5.0 < fap/fW < 15.0 \tag{25}$$

where, fap represents a focal length of the positive lens of the first lens group which is made of the optical glass material satisfying the formulae (21) to (23), fW represents a focal length of the entire zoom lens unit system at the wide-angle end.

If the parameter of the formula (25), fap/fW, is larger than 15.0, a refracting power of a lens using an anomalous dispersion material is not sufficiently to reduce second spectrum sufficiently, and may result in an insufficient correction of chromatic aberration. In contrast, if the parameter fap/fW is smaller than 5.0, it becomes difficult to achieve a balance of correction of chromatic aberration and correction of spherical aberration. Moreover, it becomes disadvantageous in processing accuracy due to a curvature of each surface of the positive lens increasing.

In each of the zoom lens units of the Embodiments 2 to 5 explained later, it is possible that at least one of the positive lenses of the first lens group have an aspheric surface, for increasing a degree of freedom of aberration correction. It is preferable that the positive lens having the aspheric surface satisfy the formulae (21) to (23).

As an optical glass material having the anomalous dispersibility which satisfies the formulae (21) to (23), one suitable for an aspheric surface molding with a glass molding technology has been developed, and an aspheric surface having a consistent performance and produced at low-cost can be obtained.

In that case, it is preferable that the first lens group have two positive lenses.

Since one of the two positive lenses can be a spherical lens, the scope of selection of the refractive index and Abbe number is wide, and the optimization of the aberration corrections can be achieved by sharing the positive power with the two lenses. Particularly, it becomes possible to obtain a balance of the correction of chromatic aberration and the correction of monochromatic aberration in a higher dimension by selecting the one having a higher refractive index.

In addition, even in a case that the lens using the optical glass material having the anomalous dispersibility is produced with the glass mold technology, cold processing such as grinding is necessary in most cases to form a preform which is a base material before shape forming, and the degree of wear of the material is important, same as before.

To obtain a good aberration correction, for example, in each of the zoom lens units of the Embodiments 2 to 5, a negative lens with a stronger concave surface toward the image side is disposed nearest to the image side of the third lens group, in addition, it is preferable that the following formula be satisfied:

$$0.6 < |r3R|/fW < 1.3 \tag{26}$$

where, r3R represents a curvature radius of the surface nearest to the image side of the third lens group.

If the parameter of the formula (26), |r3R|/fW, is smaller than 0.6, the spherical aberration is easy to be corrected excessively. If |r3R|/fW is larger than 1.3, the spherical aberration is easy to be corrected insufficiently. In addition, if the parameter of the formula (26) is outside the above-mentioned scope, it is difficult to achieve a balance of comatic aberration as well as the spherical aberration, and it is easy to generate extroversion or introversion comatic aberration at an off-axis peripheral area.

Further, relating to a displacement of the first lens group which is important for a wide angle and a long focus length, sufficient aberration correction can be achieved by satisfying the following formula:

$$0.20 < X1/fT < 0.45 \tag{27}$$

where, X1 represents a total displacement of the first lens group when changing magnification from the wide-angle end to the telephoto end, and fT represents a focal length of the entire zoom lens unit system at the telephoto end.

If the parameter of the formula (27), X1/fT, is lower than 0.20, the contribution to the changing magnification of the second lens group decreases, and the burden of the third lens group for the changing magnification increases, or the refracting powers of the first lens group and the second lens group have to be strengthened, resulting in the deterioration in various aberrations in either case.

In addition, the total length of the entire zoom lens unit at the wide-angle end is increased in length, and the height of light passing the first lens group increases, causing the increase in size of the first lens group. On the other hand, if the parameter, X1/fT is larger than 0.45, the total length at the wide-angle end becomes too short, or the total length at the telephoto end becomes too long. If the total length at the wide-angle end becomes too short, the moving space of the third lens group is limited, and the contribution to the changing magnification of the third lens group is reduced. Therefore, it becomes difficult to correct the entire aberrations. If the total length of the entire zoom lens unit at the telephoto end becomes too long, not only is the reduction of size in the total length direction disturbed, but also the radial direction grows in size for securing the peripheral light volume at the telephoto end, and the image performance is also easily deteriorated by a manufacturing error such as dropping of the lens barrel.

It is more preferable that the following formula be satisfied:

$$0.25 < X1/fT < 0.40. \tag{27A}$$

Relating to a displacement of the third lens group which shares the changing magnification function with the second lens group, it is preferable that the following formula be satisfied:

$$0.15 < X3/fT < 0.40 \tag{28}$$

where, X3 represents a total displacement of the third lens group when changing magnification from the wide-angle end to the telephoto end.

If the parameter of the formula (28), X3/fT is smaller than 0.15, the contribution to the changing magnification of the third lens group is reduced, and the burden of the second lens group is increased, or the refracting power of the third lens group itself has to be strengthened, resulting in the deterioration in various aberrations in either case. On the other hand, if the parameter, X3/fT is larger than 0.40, the total length of the entire zoom lens unit at the wide-angle end is increased and the height of light passing the first lens group increases, causing the increase in size of the first lens group.

It is more preferable that the following formula be satisfied:

$$0.20 < X3/fT < 0.35 \tag{28A}$$

In addition, relating to the refracting power of each lens group, it is preferable that the following formulae be satisfied:

$$0.50 < |f2|/f3 < 0.85 \tag{29}$$

$$5.0 < f1/fW < 8.0 \tag{30}$$

where, f1 represents a focal length of the first lens group, f2 represents a focal length of the second lens group, f3 represents a focal length of the third lens group, and fW represents a focal length of the entire zoom lens unit system at the wide-angle end.

If the parameter of the formula (29), |f2|/f3 is lower than 0.50, the refracting power of the second lens group becomes too strong; if the parameter, |f2|/f3 is larger than 0.85, the refracting power of the third lens group becomes too strong, therefore, the aberration fluctuation when changing magnification increases easily in either case.

If the parameter of the formula (30), f1/fW is lower than 5.0, it is advantageous for a high magnification ratio because the imaging magnification of the second lens group comes close to the same magnification, and the changing magnification efficiency increases. However, the large refracting power is required for each lens in the first lens group, and a negative effect such as the deterioration in the chromatic aberration especially at the telephoto end is easily produced. In addition, each lens in the first lens group is increased in thickness and diameter, and it is disadvantageous to the reduction of the size in a collapsed state. If the parameter of the formula (30), f1/fW is larger than 8.0, the contribution to the changing magnification of the second lens group is reduced, and it becomes difficult to obtain a high magnification ratio.

In each of the zoom lens units of the Embodiments 2 to 5 explained later, the aperture stop is disposed between the second and the third lens groups, and can be moved independently of the neighboring lens groups. With this structure, the most suitable light path can be selected in any position of the large changing magnification area of 6.5 times or more. Accordingly, the flexibility of corrections such as comatic aberration and field curvature can be improved, and also the off-axis performance can be improved.

It is preferable for the interval between the aperture stop and the third lens group at the wide-angle end to be wider than that at the telephoto end. By the third lens group which uses an anomalous dispersion material being left away from the aperture stop at the wide-angle end, and coming closer to the aperture stop at the telephoto end, the anomalous dispersibility effectively acts on correction of secondary spectrum of the chromatic aberration of magnification at the wide-angle end, and acts on correction of secondary spectrum of the axial chromatic aberration at the telephoto end effectively. Therefore, it is possible to correct the chromatic aberration better over the entire magnification area. In addition it is possible that the aperture stop is moved nearer to the first lens group at the wide-angle end and the height of light passing the first lens group is decreased; therefore, the size of the first lens group can be further reduced.

Therefore, in a case that the interval between the aperture stop and the third lens group at the wide-angle end is set to be wider than that at the telephoto end, relating the interval, it is preferable that the following formula be satisfied:

$$0.05 < dsw/fT < 0.20, \tag{31}$$

where, dsw represents an axial distance between the aperture stop and a lens surface nearest to the object side of the third lens group, at the wide-angle end.

If the parameter of the formula (31), dsw/fT is smaller than 0.05, the height of light passing the third lens group becomes small at the wide-angle end, and thus an effective reduction of secondary spectrum of the chromatic aberration of magnification at the wide-angle end becomes difficult. In addition, the height of light passing the first lens group becomes too large at the wide-angle end, causing the increase in size of the first lens group. If the parameter, dsw/fT is larger than 0.20, the height of light passing the third lens group at the wide-angle end becomes large. Thereby, the image plane falls to the over side, and the barrel shaped distortion increases. Especially, it becomes difficult to secure the performance at the wide field angle.

In each of the zoom lens units of the Embodiments 2 to 5 explained later, it is preferable that the first lens group include at least one negative lens and at least one positive lens from the object side. Especially, it is preferable that the first lens group include a structure of two lenses in which, arranged in order from the object side, one negative meniscus lens with a convex surface toward the object side and one positive lens with a stronger convex surface toward the object side are arranged, or a structure of three lenses in which, arranged in order from the object side, one negative meniscus lens with a convex surface toward the object side, one positive lens with a stronger convex surface toward the object side and one positive lens with a stronger convex surface toward the object side.

To achieve a high magnification ratio especially to make a focus length of the telephoto end longer, it is necessary to increase combination magnification of the second lens group, the third lens group, and the fourth lens group at the telephoto end, and the aberration generated in the first lens group is enlarged on the image plane accordingly. Therefore, it is necessary to reduce an amount of aberration generated in the first lens group small enough to achieve a high magnification ratio, and thus it is preferable to form the first lens group with the above-mentioned structure.

It is preferable that the second lens group include a structure of three lenses in which, arranged in order from the object side, one negative lens with a surface having greater curvature toward the image side, one positive lens with a surface having greater curvature toward the image side and one negative lens with a surface having greater curvature toward the object side are disposed.

It is well-known that a magnification lens group with negative refracting power which has a three-lens structure includes, in order from an object side, a negative lens, a negative lens and a positive lens. Comparing to this well-known structure, the above-mentioned structure is further excellent in correction ability of the chromatic aberration of magnification associated with a wide angle. Here, the second and the third lenses from the object side can be cemented appropriately.

It is preferable that each lens of the second lens group satisfy the following formulae.

$$1.75 < N_{21} < 2.10, 25 < v_{21} < 55 \quad (32)$$

$$1.75 < N_{22} < 2.10, 15 < v_{22} < 35 \quad (33)$$

$$1.75 < N_{23} < 2.10, 25 < v_{23} < 55 \quad (34)$$

where, $N_{2i}$, $v_{2i}$ (i=1 to 3) represent a refractive index and Abbe number of a lens i counted from the object side in the second lens group, respectively.

By selecting a kind of glass which satisfies such formulae, further excellent correction of the chromatic aberration with the monochromatic aberration being reduced sufficiently small becomes possible.

It is preferable for the third lens group to include three lenses arranged in order from the object side: a positive lens, a positive lens and a negative lens, and the second lens and the third lens from the object side can be cemented appropriately.

The fourth lens group in the zoom lens unit of the present invention is provided mainly for securement of a distance of an exit pupil (telecentric property) and focusing by a movement of the fourth lens group. For a reduction of size of the zoom lens unit, it is better that the fourth lens group have as simple a structure as possible, and it is preferable that the fourth lens group consist of one positive lens.

In addition, each of the zoom lens units of the Embodiments 2 to 5 of the present invention is not limited to a structure of four lens groups. At least one lens group, for example, a fifth lens group can be arranged on the image side of the fourth lens group, if it is necessary to increase a degree of freedom for securing the performance such as suppression of variation of aberration when changing the magnification.

In order to advance the reduction of the size while maintaining good aberration correction, it is necessary to adopt an aspheric surface, and it is preferable for at least the second lens group and the third lens group to have one aspheric surface or more, respectively. Especially in the second lens group, if both of the surfaces nearest to the object side and the surface nearest to the image side are aspheric surfaces, a high effect for the corrections of the distortion aberration, the astigmatism and the like which increase with the wide angle, can be obtained.

As the aspheric lens, a molded optical glass material and molded optical plastic material (glass mold aspheric surface and plastic mold aspheric lens), a glass lens having a surface on which a thin resin layer is molded and whose surface is formed to be an aspheric surface (described as hybrid aspheric surface, replica aspheric surface or the like) and the like can be used.

In order to simplify the mechanism, it is better for the opening diameter of the aperture stop to be constant regardless of the changing magnification. However, the change in F number associated with the changing magnification can be reduced by increasing the opening diameter at the long focal length end with respect to the short focal length end. In addition, if it is necessary to reduce the light volume which reaches the image plane, the diameter of the aperture stop can be reduced. However, it is preferable to insert an ND filter and the like without significantly changing the diameter of the aperture stop so as to reduce the light volume because the resolution deterioration by a diffraction phenomenon can be prevented.

Moreover, in each of the zoom lens units of the Embodiments 2 to 5 explained later, it is possible that either the third lens group has the positive lens which is made of the optical glass material satisfying the formulae (1) to (3), or the first lens group has the positive lens which is made of the optical glass material satisfying the formulae (21) to (23), or both of the third lens group has the positive lens which is made of the optical glass material satisfying the formulae (1) to (3), and the first lens group has the positive lens which is made of the optical glass material satisfying the formulae (21) to (23).

FIG. 1 illustrates a first embodiment of a zoom lens unit according to the present invention. This embodiment concerns Example 1 explained later.

Figure 2:
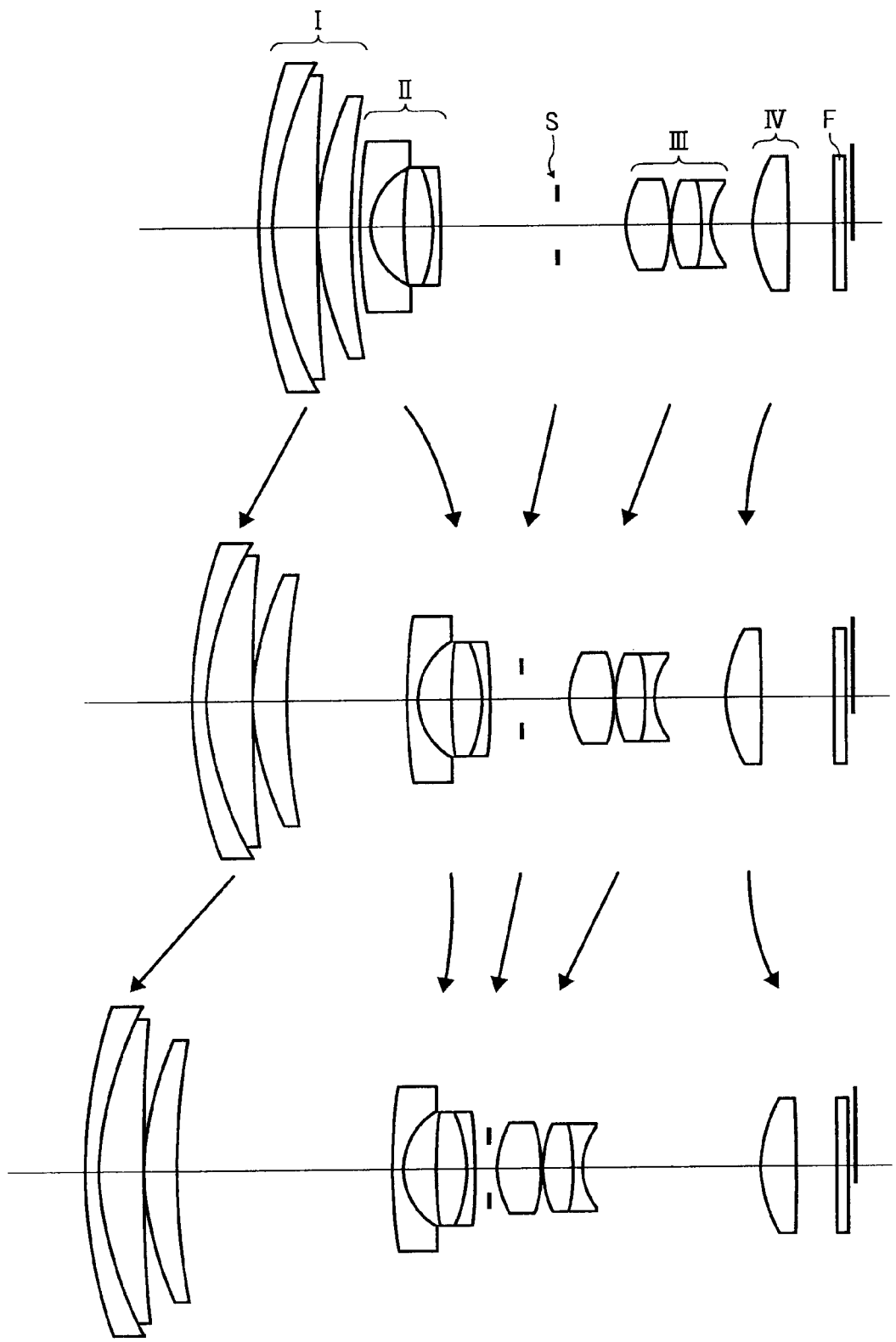
FIG. 2 is a sectional view illustrating a structure of a zoom lens unit according to Example 2 of the invention.

FIG. 2 illustrates a second embodiment of a zoom lens unit according to the present invention. This embodiment concerns Example 2 explained later.

Figure 3:
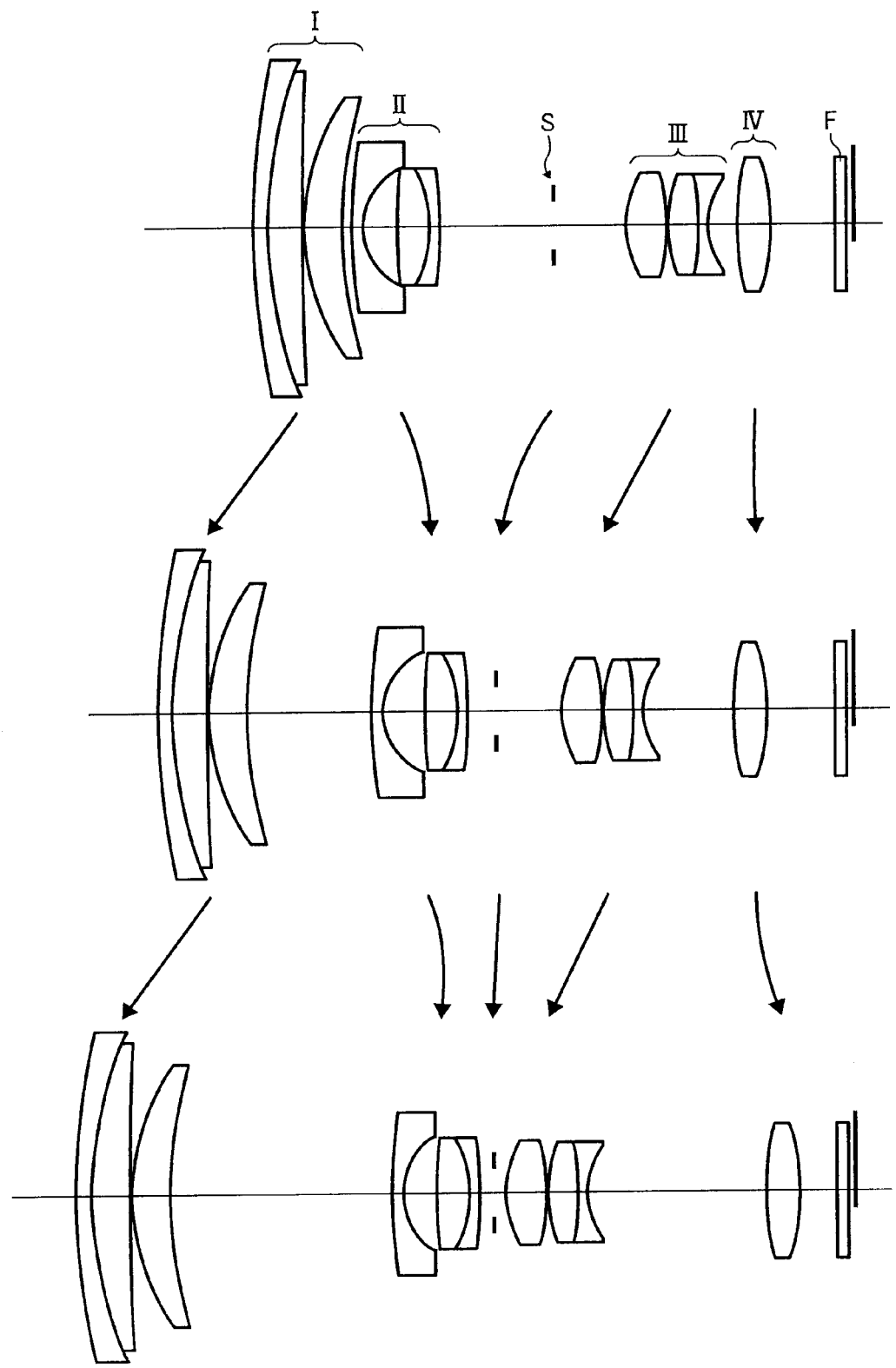
FIG. 3 is a sectional view illustrating a structure of a zoom lens unit according to Example 3 of the invention.

FIG. 3 illustrates a third embodiment of a zoom lens unit according to the present invention. This embodiment concerns Example 3 explained later.

Figure 4:
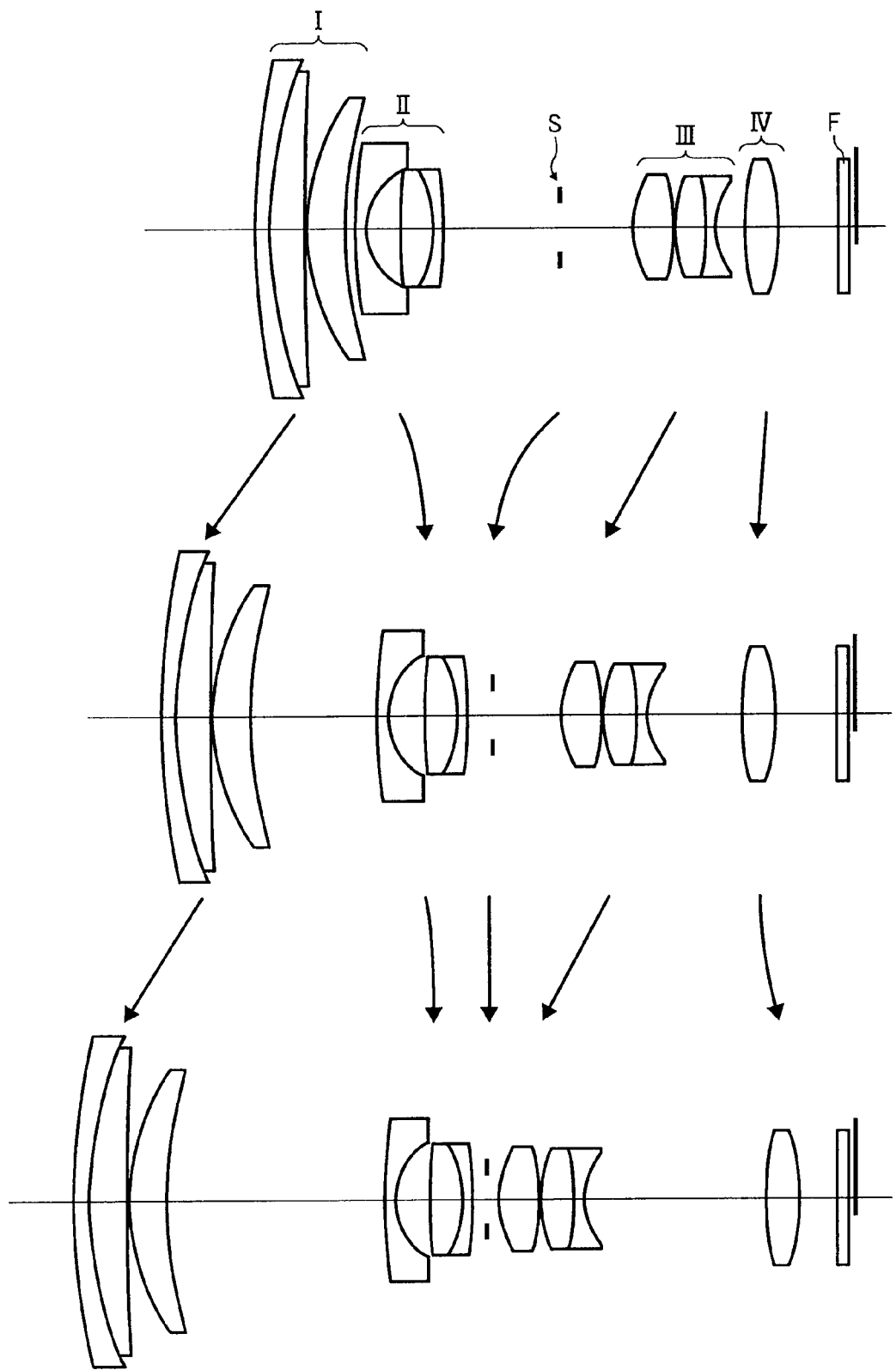
FIG. 4 is a sectional view illustrating a structure of a zoom lens unit according to Example 4 of the invention.

FIG. 4 illustrates a fourth embodiment of a zoom lens unit according to the present invention. This embodiment concerns Example 4 explained later.

Figure 5:
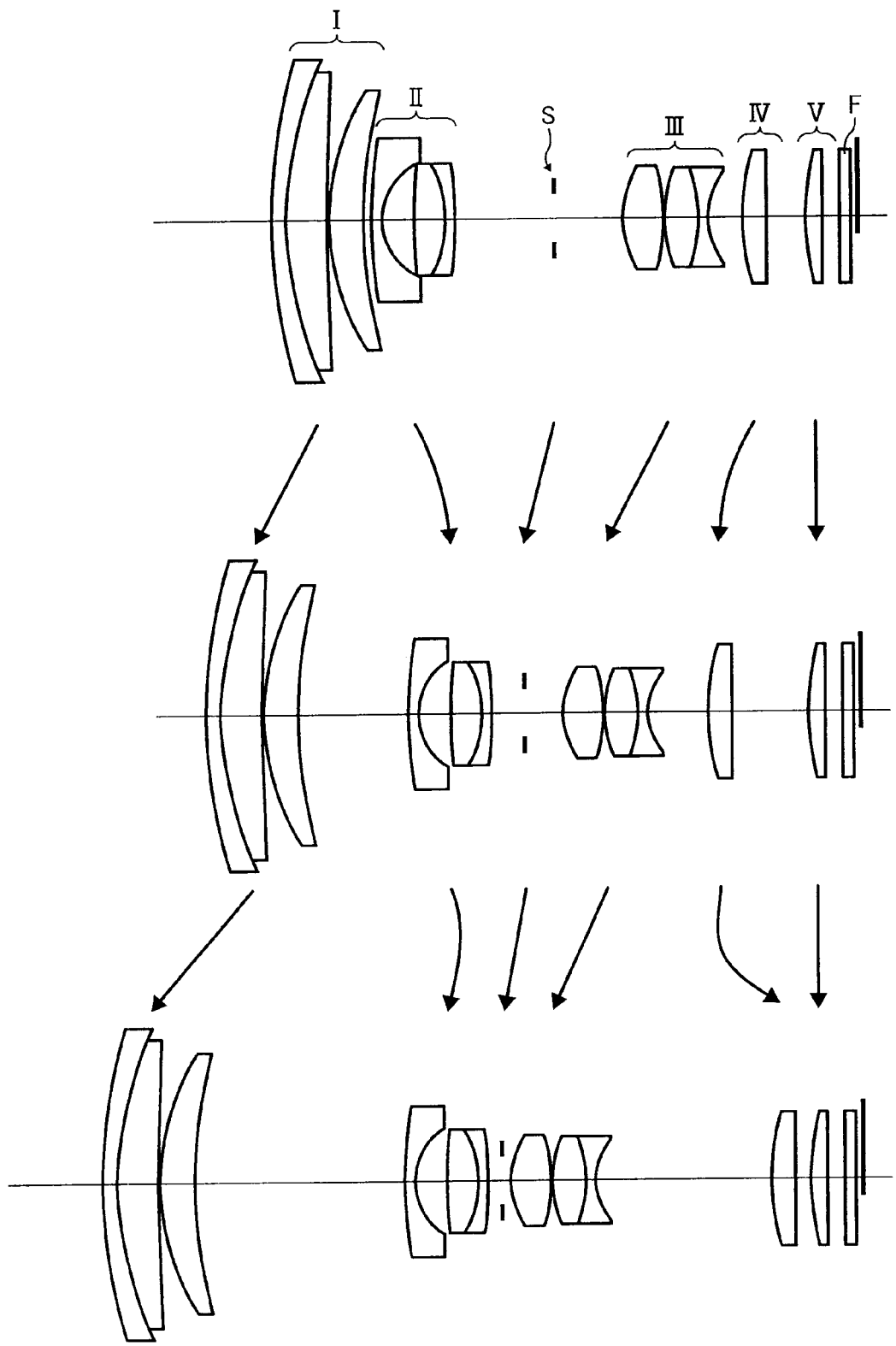
FIG. 5 is a sectional view illustrating a structure of a zoom lens unit according to Example 5 of the invention.

FIG. 5 illustrates a fifth embodiment of a zoom lens unit according to the present invention. This embodiment concerns Example 5 explained later.

Each zoom lens unit illustrated in FIGS. 1-4 includes, in order from an object side (left side in each FIG) to an image side: a first lens group (I) having a positive refracting power; a second lens group (II) having a negative refracting power; a third lens group (III) having a positive refracting power; and a fourth lens group (IV) having a positive refracting power, an aperture stop (S) being disposed between the second lens group (II) and the third lens group (III). Namely, an allocation of the refracting power of each zoom lens unit in Embodiments 1 to 4 is positive, negative, positive and positive.

A zoom lens unit illustrated in FIG. 5 includes, in order from an object side (left side in FIG. 5) to an image side: a first lens group (I) having a positive refracting power; a second lens group (II) having a negative refracting power; a third lens group (III) having a positive refracting power; a fourth lens group (IV) having a positive refracting power; and a fifth lens group (V) having a positive refracting power, an aperture stop (S) being disposed between the second lens group (II) and the third lens group (III). Namely, an allocation of the refracting power of the zoom lens unit in Embodiment 5 is positive, negative, positive, positive and positive.

When changing magnification from a wide-angle end (upper figure in each FIGS. 1-5) to a telephoto end (lower figure in each FIGS. 1-5), an interval between the first lens group (I) and the second lens group (II) increases, an interval between the second lens group (II) and the third lens group (III) decreases, an interval between the third lens group (III) and the fourth lens group (IV) increases, and the first lens group (I) and the third lens group (III) are moved to be located nearer to the object side at the telephoto end than at the wide-angle end. The fifth lens group (V) of the zoom lens unit illustrated in FIG. 5 consists of one positive meniscus lens having a convex surface toward the object side, and is not moved when changing magnification.

Namely, in Embodiment 5 illustrated in FIG. 5, the fifth lens group (V) is a fixed lens group.

In each of the embodiments illustrated in FIG. 1-5, it is possible that the third lens group (III) has two positive lenses (two biconvex lenses on the object side) and one negative lens (the lens nearest to the image side). The negative lens disposed nearest to the image side is cemented with one biconvex lens located on its object side, and the negative lens disposed nearest to the image side is a biconcave lens with a concave surface having stronger curvature toward the image side.

In each zoom lens unit of the embodiments 1 to 5, it is possible that the third lens group (III) has the positive lens which is made of the optical glass material satisfying the formulae (1) to (3).

In addition, in each zoom lens unit of the embodiments 2 to 5, it is possible that either the third lens group (III) has the positive lens which is made of the optical glass material satisfying the formulae (1) to (3), or the first lens group (I) has the positive lens which is made of the optical glass material satisfying the formulae (21) to (23), or both of the third lens group (III) has the positive lens which is made of the optical glass material satisfying the formulae (1) to (3), and the first lens group (I) has the positive lens which is made of the optical glass material satisfying the formulae (21) to (23).

In the embodiments illustrated in FIGS. 1 to 3 (Examples 1 to 3 explained later), it is possible that an optical glass material of the biconvex lens nearest to the object side (the left side in each FIG) of the third lens group (III) satisfies the formulae (1) to (3). In this case, it is possible that an optical glass material of the biconvex lens cemented with the negative lens does not satisfy the formulae (1) to (3).

In the embodiment illustrated in FIG. 4 (Example 4 explained later), it is possible that an optical glass material of the biconvex lens cemented with the negative lens of the third lens group (III) satisfies the formulae (1) to (3), and an optical glass material of the biconvex lens which is disposed nearest to the object side does not satisfy the formulae (1) to (3).

In the embodiment illustrated in FIG. 5 (Example 5 explained later), it is possible that an optical glass material of the biconvex lens cemented with the negative lens of the third lens group (III) satisfies the formulae (1) to (3), and an optical glass material of the biconvex lens which is disposed nearest to the object side does not satisfy the formulae (2) and (3).

Moreover, it is possible that each zoom lens unit of Examples 1 to 5 corresponding to the embodiments 1 to 5 respectively satisfies the formulae (4) to (11), and the formulae (7A) and (8A) as well. Furthermore, it is possible that each zoom lens unit of Examples 2 to 5 corresponding to the embodiments 2 to 5 respectively satisfies, either the formulae (4) to (11) and the formulae (7A) and (8A), or the formulae (24) to (31) and the formulae (27A) and (28A), or all of the formulae (4) to (11), and (7A) and (8A), and (24) to (31) and (27A) and (28A).

Next, an embodiment of a portable information terminal device will be explained with reference to FIGS. 21A to 21C and 22.

The portable information terminal device includes an imaging device, for example a camera, as a camera function part.

Figure 21A:
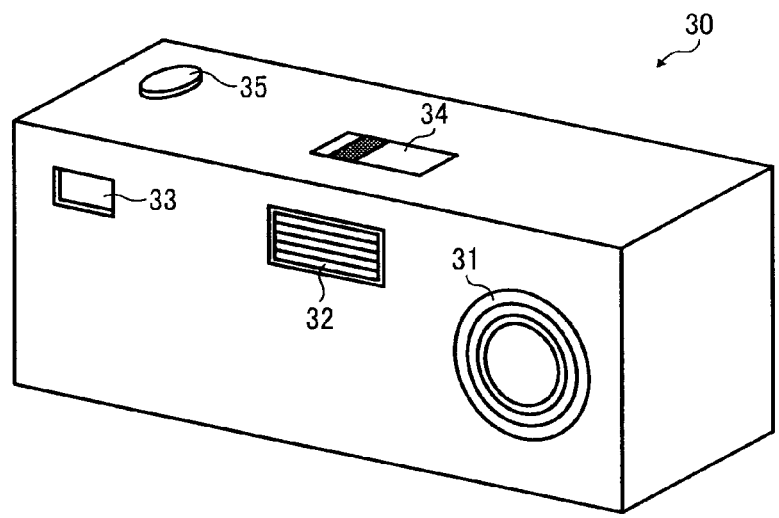
FIGS. 21A-21C are views explaining photographing functional parts of a camera as an embodiment of a portable information terminal device according to the invention.
Figure 21B:
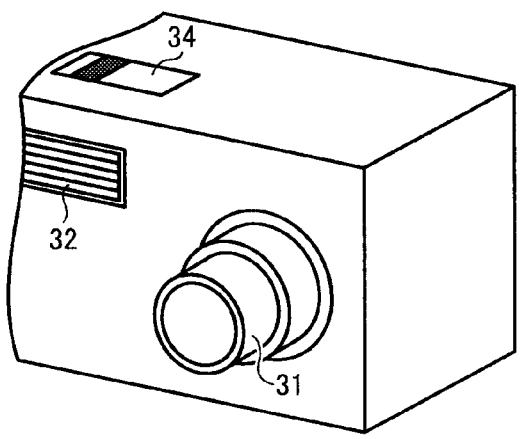
Figure 21C:
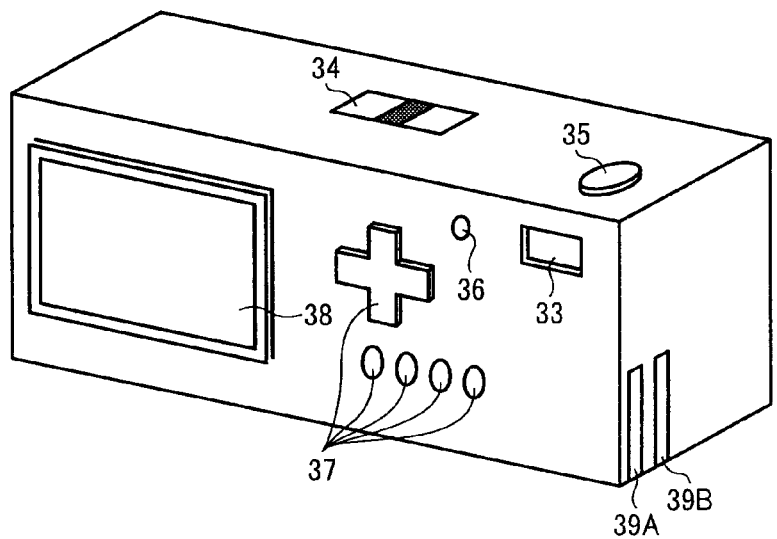
Figure 22:
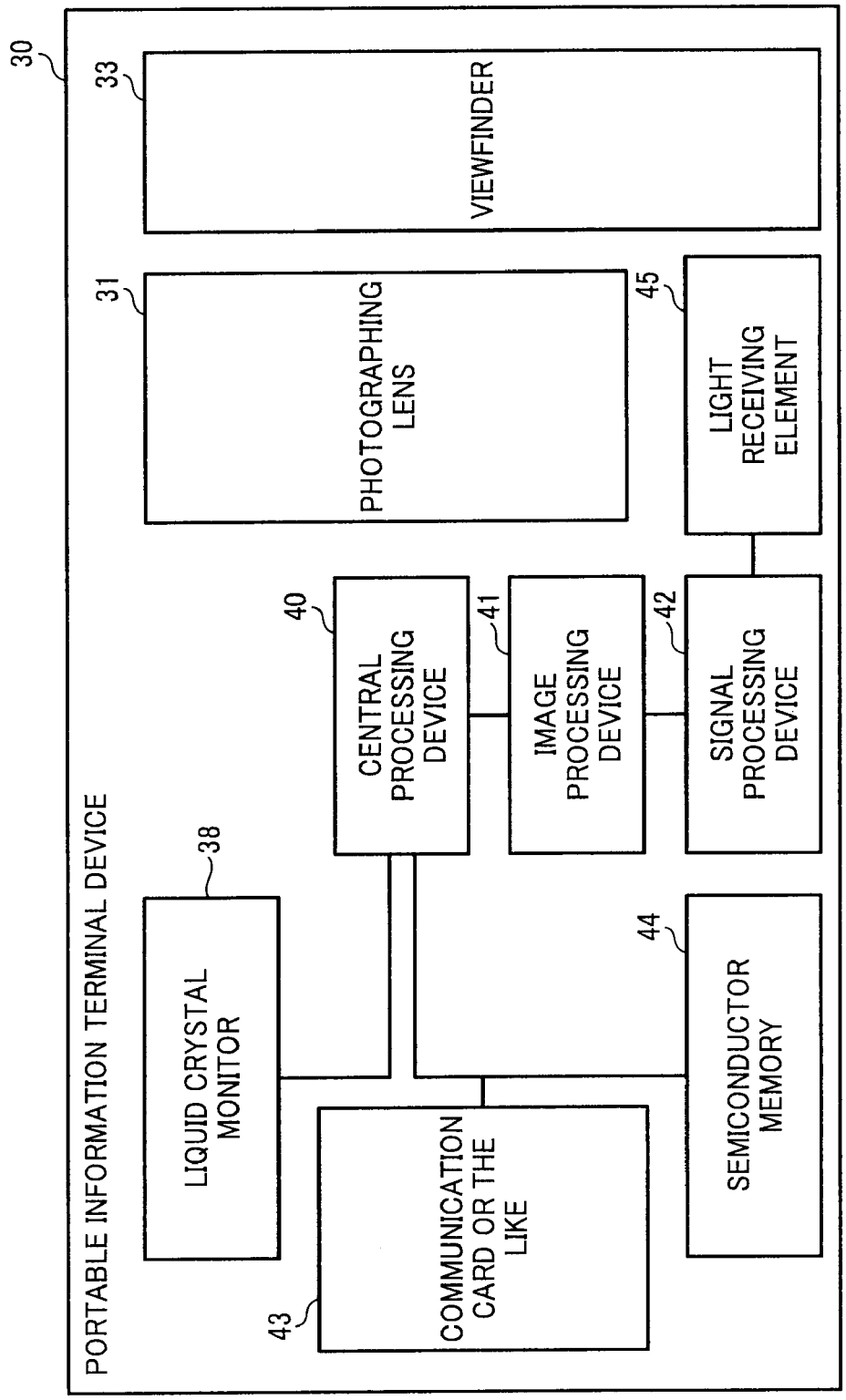
FIG. 22 is a figure explaining a system of the portable information terminal device illustrated in FIGS. 21A-21C.

FIGS. 21A to 21C illustrate an external appearance of the camera (the camera function part of the portable information terminal device) according to the embodiment of the present invention, and FIG. 22 illustrates a system structure of the portable information terminal device.

As illustrated in FIG. 22, a portable information terminal device 30 includes a photographing lens 31 and a light receiving element 45 (for example, an electronic imaging element in which 10 million to 15 million pixels are arranged two-dimensionally), and an image of a photographing object formed by the photographing lens 31 is read by the light receiving element 45.

As the photographing lens 31, for example, any one of the above-mentioned zoom lens units, more particularly, a zoom lens unit explained in the after-mentioned examples can be used.

An output from the light receiving element 45 is processed by a signal processing device 42 which receives a control of a central processing device 40, and is converted into digital information. Image information digitised is recorded in a semiconductor memory 44, after receiving a predetermined image processing in an image processing device 41 which receives a control of the central processing device 40.

A liquid crystal monitor 38 can display an image during photographing after being image-processed in the image processing device 41, and also an image recorded in the semiconductor memory 44. Moreover, the image recorded in the semiconductor memory 44 can be exported by using a communication card 43, etc.

The image processing device 41 has a function of carrying out an electric correction of shading, cropping of a center part of the image or the like.

As illustrated in FIG. 21A, when the portable information terminal device is carried, the photographing lens 31 is in a collapsed state, and when a power supply switch 36 is operated by the user to turn on the power, the lens barrel extends, as illustrated in FIG. 21B.

At this time, inside the lens barrel, each lens group of the zoom lens unit is disposed, for example, at a corresponding position at the wide-angle end, and by operating a zoom lever 34, the arrangement of each lens group changes and changing magnification to the telephoto end can be performed. In addition, variations in field angle of the photographing lens 31 are reflected in a finder 33.

The focusing is performed by pressing a shutter button 35 halfway.

The focusing can be performed by moving the second lens group or the fourth lens group, or the light receiving element 45, or by moving the second lens group or the fourth lens group together with moving the light receiving element 45.

When displaying the image recorded in the semiconductor memory 44 on the liquid crystal monitor 38, and when exporting the image by using the communication card 43, etc., operation buttons 37 illustrated in FIG. 21C can be used. The semiconductor memory and the communication card or the like are inserted into the exclusive-use or general-purpose slots 39A, 39B respectively, for use.

When the photographing lens 31 is in the collapsed state, each lens group of the zoom lens unit is not necessarily lined up on an optical axis. For example, if a mechanism in which the third lens group and/or the fourth lens group retract from the optical axis and are stored in parallel with the other lens groups is used, a further reduction in thickness of the portable information terminal device can be achieved.

In the above-mentioned portable information terminal device which has the camera as a part with the photograph function, any one of zoom lens units of Examples 1-5 can be used as the photographing lens 31, and a compact, high image quality portable information terminal device with camera function which is equipped with the light receiving element 45 of 10 million pixels or more, can be achieved.

EXAMPLES

Hereinafter, examples of the zoom lens unit according to the present invention will be explained in detail. A maximum image height in all the examples is 4.05 mm.

$A_6$: Aspheric surface coefficient of 6-order
$A_8$: Aspheric surface coefficient of 8-order
$A_{10}$: Aspheric surface coefficient of 10-order
$A_{12}$: Aspheric surface coefficient of 12-order
$A_{14}$: Aspheric surface coefficient of 14-order
$A_{16}$: Aspheric surface coefficient of 16-order
$A_{18}$: Aspheric surface coefficient of 18-order The aspheric surface in the examples can be expressed by the following equation (A), using an inverse number of paraxial curvature radius (paraxial curvature), C, a height from the optical axis, H, an aspheric surface amount in an optical axis direction, X, the cone constant number of aspheric surface, K, and the aspheric surface coefficients, $A_4$-$A_{18}$.

$$X = CH^2 / \{1 + \sqrt{(1-(1+K)C^2H^2)}\} + A_4 \cdot H^4 + A_6 \cdot H^6 + A_8 \cdot H^8 + A_{10} \cdot H^{10} + A_{12} \cdot H^{12} + A_{14} \cdot H^{14} + A_{16} \cdot H^{16} + A_{18} \cdot H^{18} \quad (A)$$

Example 1

TABLE 1

| f = 5.07-34.50, F = 3.48-5.65, ω = 39.79-6.52 | | | | | | |
|---|---|---|---|---|---|---|
| SURFACE NO | R | D | Nd | vd | Pg. F | GLASS |
| 01 | 44.010 | 1.00 | 1.92286 | 18.90 | 0.6495 | OHARA S-NPH2 |
| 02 | 25.696 | 2.58 | 1.71300 | 53.87 | 0.5459 | OHARA S-LAL8 |
| 03 | 158.136 | 0.10 | | | | |
| 04 | 21.124 | 2.23 | 1.77250 | 49.60 | 0.5520 | OHARA S-LAH66 |
| 05 | 60.343 | VARIABLE (A) | | | | |
| 06* | 48.042 | 0.74 | 1.88300 | 40.76 | 0.5667 | OHARA S-LAH58 |
| 07 | 4.562 | 2.45 | | | | |
| 08 | 46.615 | 2.12 | 1.92286 | 18.90 | 0.6495 | OHARA S-NPH2 |
| 09 | −10.781 | 0.64 | 2.00330 | 28.27 | 0.5980 | OHARA S-LAH79 |
| 10* | −176.830 | VARIABLE (B) | | | | |
| 11 | APERTURE STOP | VARIABLE (C) | | | | |
| 12* | 5.844 | 2.95 | 1.55332 | 71.68 | 0.5402 | HOYA M-FCD500 |
| 13* | −9.056 | 0.10 | | | | |
| 14 | 7.355 | 2.10 | 1.62230 | 53.17 | 0.5542 | OHARA S-BSM22 |
| 15 | −12.396 | 0.60 | 1.90366 | 31.32 | 0.5947 | HOYA TAFD25 |
| 16 | 4.446 | VARIABLE (D) | | | | |
| 17* | 8.757 | 2.29 | 1.52470 | 56.20 | | OPTICAL PLASTIC |
| 18 | 106.665 | VARIABLE (E) | | | | |
| 19 | ∞ | 0.80 | 1.51680 | 64.20 | | VARIOUS FILTERS |
| 20 | ∞ | | | | | |

In each example, a parallel plate (FIGS. 1 to 4, represented by "F") disposed on the image side of the fourth lens group (IV), is assumed to be the parallel plate equivalent of various filters such as optical low-pass filters and infrared rays cutting filters, or a cover glass (seal glass) of light receiving elements such as CCD sensors.

In all the examples, the positive lens which constitutes the fourth lens group (IV) is made of an optical plastic, all the other lenses are made of an optical glass material. Meanings of signs in the examples are as follows:
f: focal length of an entire zoom lens unit system
F: F-number
ω: half-field angle
R: curvature radius
D: surface distance
$N_d$: refractive index
$v_d$: Abbe number
K: Cone constant number of aspheric surface
$A_4$: Aspheric surface coefficient of 4-order Aspheric Surface (An aspheric surface is the one attached with an asterisk "*" in the above-mentioned data. It is similar in the following examples.)

Sixth Surface $K=0.0, A4=2.47187 \times 10^{-5}, A6=-2.33739 \times 10^{-6}, A8=1.40335 \times 10^{-7},$ $A10=-3.70011 \times 10^{-9}, A12=3.54383 \times 10^{-12}, A14=6.39319 \times 10^{-13}$ Tenth Surface $K=0.0, A4=-3.99709 \times 10^{-4}, A6=-3.19281 \times 10^{-6}, A8=-1.20904 \times 10^{-7},$ $A10=-3.19854 \times 10^{-8}$ Twelfth Surface $K=0.0, A4=-8.15177 \times 10^{-4}, A6=1.43767 \times 10^{-5}, A8=-1.42505 \times 10^{-6},$ $A10=9.97953 \times 10^{-8}$ Thirteenth Surface $K=0.0, A4=5.34757\times10^{-4}, A6=2.83041\times10^{-5}, A8=-2.34413\times10^{-6},$ $A10=1.69514\times10^{-7}$ Seventeenth Surface $K=0.0, A4=-1.04517\times10^{-4}, A6=7.81280\times10^{-6}, A8=-2.51666\times10^{-7},$ $A10=4.09360\times10^{-9}$

TABLE 2

| | Variable Amount | | |
|---|---|---|---|
| | SHORT FOCAL LENGTH END f = 5.072 | INTERMEDIATE FOCAL LENGTH f = 13.168 | LONG FOCAL LENGTH END f = 34.499 |
| A | 0.600 | 8.550 | 14.656 |
| B | 9.480 | 3.800 | 0.900 |
| C | 4.263 | 1.650 | 0.650 |
| D | 4.210 | 6.003 | 11.719 |
| E | 2.445 | 4.222 | 3.015 |

Values of Parameters in Each Formula:

$Pg,F-(-0.001802\times vd+0.6483)=0.0211\ldots$ HOYA M-FCD500

FA=430 HOYAM-FCD500

$fap/fW=1.36$ $|r3R|/fW=0.877$ $X1/fT=0.288$ $X3/fT=0.234$ $|f2|/f3=0.716$ $f1/fW=6.11$ $dSW/fT=0.124$ Example 2

TABLE 3

| | f = 5.07-34.53, F = 3.45-5.61, ω = 39.75-6.55 | | | | | |
|---|---|---|---|---|---|---|
| SURFACE NO | R | D | Nd | vd | Pg. F | GLASS |
| 01 | 34.416 | 1.00 | 2.00069 | 25.46 | 0.6135 | HOYA TAFD40 |
| 02 | 19.937 | 2.91 | 1.59282 | 68.63 | 0.5441 | HOYA FCD505 |
| 03 | 130.300 | 0.10 | | | | |
| 04 | 19.487 | 2.43 | 1.77250 | 49.60 | 0.5520 | OHARA S-LAH66 |
| 05 | 67.560 | VARIABLE (A) | | | | |
| 06* | 49.383 | 0.74 | 1.88300 | 40.76 | 0.5667 | OHARA S-LAH58 |
| 07 | 4.329 | 2.19 | | | | |
| 08 | 35.544 | 1.99 | 1.92286 | 18.90 | 0.6495 | OHARA S-NPH2 |
| 09 | −11.473 | 0.64 | 2.00330 | 28.27 | 0.5980 | OHARA S-LAH79 |
| 10* | −220.632 | VARIABLE (B) | | | | |
| 11 | APERTURE STOP | VARIABLE (C) | | | | |
| 12* | 5.883 | 2.93 | 1.55332 | 71.68 | 0.5402 | HOYA M-FCD500 |
| 13* | −8.593 | 0.10 | | | | |
| 14 | 8.618 | 2.20 | 1.65100 | 56.16 | 0.5482 | OHARA S-LAL54 |
| 15 | −9.711 | 0.60 | 1.85026 | 32.27 | 0.5929 | OHARA S-LAH71 |
| 16 | 4.491 | VARIABLE (D) | | | | |
| 17* | 10.454 | 2.21 | 1.52470 | 56.20 | | OPTICAL PLASTIC |
| 18 | −99.551 | VARIABLE (E) | | | | |
| 19 | ∞ | 0.80 | 1.51680 | 64.20 | | VARIOUS FILTERS |
| 20 | ∞ | | | | | |

Aspheric Surface
Sixth Surface $K=0.0, A4=4.38118\times10^{-5}, A6=-3.28212\times10^{-6}, A8=1.67801\times10^{-7},$ $A10=-4.32537\times10^{-9}, A12=-1.26659\times10^{-11}, A14=1.27763\times10^{-12}$ Tenth Surface $K=0.0, A4=-4.80018\times10^{-4}, A6=-4.53081\times10^{-6}, A8=-2.73503\times10^{-7},$ $A10=-5.07166\times10^{-8}$ Twelfth Surface $K=0.0, A4=-8.76064\times10^{-4}, A6=1.71719\times10^{-5}, A8=-1.39333\times10^{-6},$ $A10=9.31505\times10^{-8}$ Thirteenth Surface $K=0.0, A4=5.89357\times10^{-4}, A6=3.03606\times10^{-5}, A8=-2.25267\times10^{-6},$ $A10=1.54591\times10^{-7}$ Seventeenth Surface $K=0.0, A4=-5.88625\times10^{-5}, A6=1.08911\times10^{-5}, A8=-4.32420\times10^{-7},$ $A10=7.34514\times10^{-9}$

TABLE 4

| | Variable Amount | | |
|---|---|---|---|
| | SHORT FOCAL LENGTH END f = 5.075 | INTERMEDIATE FOCAL LENGTH f = 13.180 | LONG FOCAL LENGTH END f = 34.531 |
| A | 0.600 | 8.169 | 14.520 |
| B | 7.927 | 2.234 | 0.900 |
| C | 4.439 | 3.062 | 0.650 |
| D | 2.823 | 4.745 | 11.720 |
| E | 3.435 | 5.264 | 3.014 |

Values of Parameters in Each Formula:

$Pg,F-(-0.001802 \times vd + 0.6483) = 0.0211 \ldots$ HOYA M-FCD500

$fap/fW = 1.36$ $FA = 430$ HOYAM-FCD500

$|r3R|/fW = 0.885$ $X1/fT = 0.335$ $X3/fT = 0.245$ $|f2|/f3 = 0.716$ $f1/fW = 6.06$ $dSW/fT = 0.129$

Example 3

TABLE 5

| | f = 5.07-34.45, F = 3.44-5.57, ω = 39.77-6.81 | | | | | |
|---|---|---|---|---|---|---|
| SURFACE NO | R | D | Nd | vd | Pg. F | GLASS |
| 01 | 52.874 | 1.00 | 1.92286 | 18.90 | 0.6495 | OHARA S-NPH2 |
| 02 | 30.779 | 2.45 | 1.78800 | 47.37 | 0.5559 | OHARA S-LAH64 |
| 03 | 566.184 | 0.10 | | | | |
| 04* | 14.939 | 2.58 | 1.55332 | 71.68 | 0.5402 | HOYA M-FCD500 |
| 05 | 30.390 | VARIABLE (A) | | | | |
| 06* | 48.218 | 0.74 | 1.88300 | 40.76 | 0.5667 | OHARA S-LAH58 |
| 07 | 4.324 | 2.33 | | | | |
| 08 | 205.967 | 2.16 | 2.00069 | 25.46 | 0.6135 | HOYA TAFD40 |
| 09 | −7.694 | 0.64 | 1.85135 | 40.10 | 0.5694 | HOYA M-TAFD305 |
| 10* | −521.286 | VARIABLE (B) | | | | |
| 11 | APERTURE STOP | VARIABLE (C) | | | | |
| 12* | 6.137 | 2.80 | 1.55332 | 71.68 | 0.5402 | HOYA M-FCD500 |
| 13* | −8.456 | 0.10 | | | | |
| 14 | 9.541 | 2.21 | 1.61800 | 63.33 | 0.5441 | OHARA S-PHM52 |
| 15 | −11.599 | 0.60 | 1.85026 | 32.27 | 0.5929 | OHARA S-LAH71 |
| 16 | 4.921 | VARIABLE (D) | | | | |
| 17* | 21.300 | 2.25 | 1.52470 | 56.20 | | OPTICAL PLASTIC |
| 18 | −13.467 | VARIABLE (E) | | | | |
| 19 | ∞ | 0.80 | 1.51680 | 64.20 | | VARIOUS FILTERS |
| 20 | ∞ | | | | | |

Aspheric Surface

Fourth Surface $K=0.0, A4=-2.61959 \times 10^{-6}, A6=-4.61000 \times 10^{-8}, A8=4.12097 \times 10^{-10}$, $A10=-2.83406 \times 10^{-12}$ Sixth Surface $K=0.0, A4=4.69989 \times 10^{-5}, A6=-6.00298 \times 10^{-6}, A8=2.85972 \times 10^{-7}$, $A10=-4.67475 \times 10^{-9}, A12=-8.20307 \times 10^{-11}, A14=2.46554 \times 10^{-12}$ Tenth Surface $K=0.0, A4=-5.17867 \times 10^{-4}, A6=-9.91338 \times 10^{-6}, A8=-2.02961 \times 10^{-7}$, $A10=-5.38642 \times 10^{-8}$ Twelfth Surface $K=0.0, A4=-7.45563 \times 10^{-4}, A6=1.45957 \times 10^{-5}, A8=-1.41743 \times 10^{-6}$, $A10=1.11141 \times 10^{-7}$ Thirteenth Surface $K=0.0, A4=7.01916 \times 10^{-4}, A6=2.59719 \times 10^{-5}, A8=-2.44987 \times 10^{-6}$, $A10=1.76570 \times 10^{-7}$ Seventeenth Surface $K=0.0, A4=-2.49031 \times 10^{-5}, A6=6.74925 \times 10^{-6}, A8=-2.86346 \times 10^{-7}$, $A10=4.04476 \times 10^{-9}$

TABLE 6

| | Variable Amount | | |
|---|---|---|---|
| | SHORT FOCAL LENGTH END f = 5.074 | INTERMEDIATE FOCAL LENGTH f = 13.161 | LONG FOCAL LENGTH END f = 34.450 |
| A | 0.600 | 8.718 | 14.856 |
| B | 7.529 | 1.935 | 0.900 |

TABLE 6-continued

| | Variable Amount | | |
|---|---|---|---|
| | SHORT FOCAL LENGTH END f = 5.074 | INTERMEDIATE FOCAL LENGTH f = 13.161 | LONG FOCAL LENGTH END f = 34.450 |
| C | 4.880 | 4.129 | 0.650 |
| D | 2.000 | 6.189 | 11.984 |
| E | 4.365 | 4.469 | 2.532 |

Values of Parameters in Each Formula:

$Pg,F-(-0.001802 \times vd + 0.6483) = 0.0211 \ldots$ HOYA M-FCD500

$FA = 430$ HOYAM-FCD500

$fap/fW = 1.36$ $|r3R|/fW = 0.970 \times$ $X1/fT = 0.335$ $X3/fT=0.231$ $|f2|/f3=0.713$ $f1/fW=6.26$ $dSW/fT=0.142$ Example 4

TABLE 7 f = 5.06-34.50, F = 3.49-5.67, ω = 39.85-6.77

| SURFACE NO | R | D | Nd | vd | Pg. F | GLASS |
|---|---|---|---|---|---|---|
| 01 | 46.479 | 1.00 | 1.92286 | 18.90 | 0.6495 | OHARA S-NPH2 |
| 02 | 28.340 | 2.56 | 1.77250 | 49.60 | 0.5520 | OHARA S-LAH66 |
| 03 | 416.600 | 0.10 | | | | |
| 04* | 14.296 | 2.40 | 1.55332 | 71.68 | 0.5402 | HOYA M-FCD500 |
| 05 | 26.318 | VARIABLE (A) | | | | |
| 06* | 50.551 | 0.74 | 1.88300 | 40.76 | 0.5667 | OHARA S-LAH58 |
| 07 | 4.347 | 2.39 | | | | |
| 08 | 268.383 | 2.18 | 2.00069 | 25.46 | 0.6135 | HOYA TAFD40 |
| 09 | −7.762 | 0.64 | 1.85135 | 40.10 | 0.5694 | HOYA M-TAFD305 |
| 10* | −405.417 | VARIABLE (B) | | | | |
| 11 | APERTURE STOP | VARIABLE (C) | | | | |
| 12* | 6.037 | 2.75 | 1.51633 | 64.06 | 0.5333 | OHARA L-BSL7 |
| 13 | −8.210 | 0.10 | | | | |
| 14 | 7.936 | 2.36 | 1.59282 | 68.63 | 0.5441 | HOYA FCD505 |
| 15 | −9.478 | 0.60 | 1.85026 | 32.27 | 0.5929 | OHARA S-LAH71 |
| 16 | 4.855 | VARIABLE (D) | | | | |
| 17* | 21.081 | 2.00 | 1.52470 | 56.20 | | OPTICAL PLASTIC |
| 18 | −13.476 | VARIABLE (E) | | | | |
| 19 | ∞ | 0.80 | 1.51680 | 64.20 | | VARIOUS FILTERS |
| 20 | ∞ | | | | | |

Aspheric Surface
Fourth Surface $K=0.0$, $A4=-2.13930\times10^{-6}$, $A6=-5.68815\times10^{-8}$, $A8=5.09447\times10^{-10}$, $A10=-3.52370\times10^{-12}$ Sixth Surface $K=0.0$, $A4=6.98920\times10^{-5}$, $A6=-6.51267\times10^{-6}$, $A8=3.05288\times10^{-7}$, $A10=-4.97334\times10^{-9}$, $A12=-7.64920\times10^{-11}$, $A14=2.31453\times10^{-12}$ Tenth Surface $K=0.0$, $A4=-4.84852\times10^{-4}$, $A6=-1.06293\times10^{-5}$, $A8=1.65811\times10^{-8}$, $A10=-5.72723\times10^{-8}$ Twelfth Surface $K=0.0$, $A4=-7.11335\times10^{-4}$, $A6=1.19186\times10^{-5}$, $A8=-1.35662\times10^{-6}$, $A10=1.20507\times10^{-7}$ Thirteenth Surface $K=0.0$, $A4=6.51905\times10^{-4}$, $A6=2.55654\times10^{-5}$, $A8=-2.41458\times10^{-6}$, $A10=1.89127\times10^{-7}$ Seventeenth Surface $K=0.0$, $A4=-9.04702\times10^{-5}$, $A6=9.86668\times10^{-6}$, $A8=-4.20068\times10^{-7}$, $A10=6.42194\times10^{-9}$

TABLE 8

| | Variable Amount | | |
|---|---|---|---|
| | SHORT FOCAL LENGTH END f = 5.061 | INTERMEDIATE FOCAL LENGTH f = 13.144 | LONG FOCAL LENGTH END f = 34.503 |
| A | 0.600 | 8.583 | 14.642 |
| B | 7.867 | 1.694 | 0.900 |

TABLE 8-continued

| | Variable Amount | | |
|---|---|---|---|
| | SHORT FOCAL LENGTH END f = 5.061 | INTERMEDIATE FOCAL LENGTH f = 13.144 | LONG FOCAL LENGTH END f = 34.503 |
| C | 4.718 | 4.584 | 0.650 |
| D | 2.000 | 6.351 | 11.947 |
| E | 4.180 | 4.150 | 2.557 |

Values of Parameters in Each Formula $Pg,F-(-0.001802\times vd+0.6483)=0.0195$ ... HOYA FCD505

FA=460 HOYAM-FCD505

$fap/fW=1.52$ $|r3R|/fW=0.959\times$ $X1/fT=0.328$ $X3/fT=0.241$ $|f2|/f3=0.718$ $f1/fW=6.26$ $dSW/fT=0.137$ Example 5

TABLE 9 f = 5.07-34.46, F = 3.43-5.79, ω = 39.82-6.53

| SURFACE NO | R | D | Nd | vd | Pg, F | GLASS |
|---|---|---|---|---|---|---|
| 01 | 36.861 | 1.00 | 1.92286 | 18.90 | 0.6495 | OHARA S-NPH2 |
| 02 | 24.198 | 2.90 | 1.59282 | 68.63 | 0.5520 | HOYA FCD505 |
| 03 | 370.861 | 0.10 | | | | |
| 04 | 17.021 | 2.37 | 1.75500 | 52.32 | 0.5402 | HOYA TAC6 |
| 05 | 35.390 | VARIABLE (A) | | | | |
| 06* | 33.358 | 0.74 | 1.88300 | 40.76 | 0.5667 | OHARA S-LAH58 |
| 07 | 4.063 | 2.16 | | | | |
| 08 | 72.493 | 2.09 | 1.84666 | 23.78 | 0.6135 | HOYA FDS90 |
| 09 | −7.451 | 0.64 | 1.82080 | 42.71 | 0.5694 | HOYA M-TAFD51 |
| 10* | −534.330 | VARIABLE (B) | | | | |
| 11 | APERTURE STOP | VARIABLE (C) | | | | |
| 12* | 6.787 | 2.76 | 1.58913 | 61.15 | 0.5333 | OHARA L-BAL35 |
| 13* | −8.678 | 0.13 | | | | |
| 14 | 11.340 | 2.33 | 1.59282 | 68.63 | 0.5441 | HOYA FCD505 |
| 15 | −7.520 | 0.60 | 1.68893 | 31.16 | 0.5929 | HOYA E-FD8 |
| 16 | 4.761 | VARIABLE (D) | | | | |
| 17* | 13.573 | 1.74 | 1.52470 | 56.20 | | OPTICAL PLASTIC |
| 18 | 153.380 | VARIABLE (E) | | | | |
| 19 | 15.998 | 1.20 | 1.48749 | 70.44 | | HOYA FC5 |
| 20 | 234.342 | 1.10 | | | | |
| 21 | ∞ | 0.80 | 1.51680 | 64.20 | | VARIOUS FILTERS |
| 22 | ∞ | | | | | |

Aspheric Surface

Sixth Surface $K=0.0, A4=-2.11567\times10^{-5}, A6=1.02684\times10^{-7}, A8=-4.62111\times10^{-8}$, $A10=7.02968\times10^{-10}$ Tenth Surface $K=0.0, A4=-6.56577\times10^{-4}, A6=-6.52956\times10^{-6}, A8=-1.05912\times10^{-6}$, $A10=-5.75774\times10^{-8}$ Twelfth Surface $K=0.0, A4=-8.54494\times10^{-4}, A6=5.37510\times10^{-6}, A8=-8.26341\times10^{-7}$, $A10=-5.09750\times10^{-8}$ Thirteenth Surface $K=0.0, A4=3.54458\times10^{-4}, A6=6.38751\times10^{-6}, A8=-7.62332\times10^{-7}$, $A10=-5.58192\times10^{-8}$ Seventeenth Surface $K=0.0, A4=-3.04703\times10^{-5}, A6=1.04070\times10^{-5}, A8=-4.76045\times10^{-7}$, $A10=9.37621\times10^{-9}$

TABLE 10

| | Variable Amount | | |
|---|---|---|---|
| | SHORT FOCAL LENGTH END f = 5.067 | INTERMEDIATE FOCAL LENGTH f = 13.151 | LONG FOCAL LENGTH END f = 34.459 |
| A | 0.600 | 7.344 | 14.239 |
| B | 6.716 | 2.239 | 0.950 |
| C | 4.616 | 2.573 | 0.600 |
| D | 2.503 | 4.089 | 11.904 |
| E | 2.666 | 5.280 | 1.000 |

Values of Parameters in Each Formula:

$Pg,F-(-0.001802\times vd+0.6483)=0.0195$ ... HOYA FCD505

$FA=460$ ... HOYA FCD505

Figure 6:
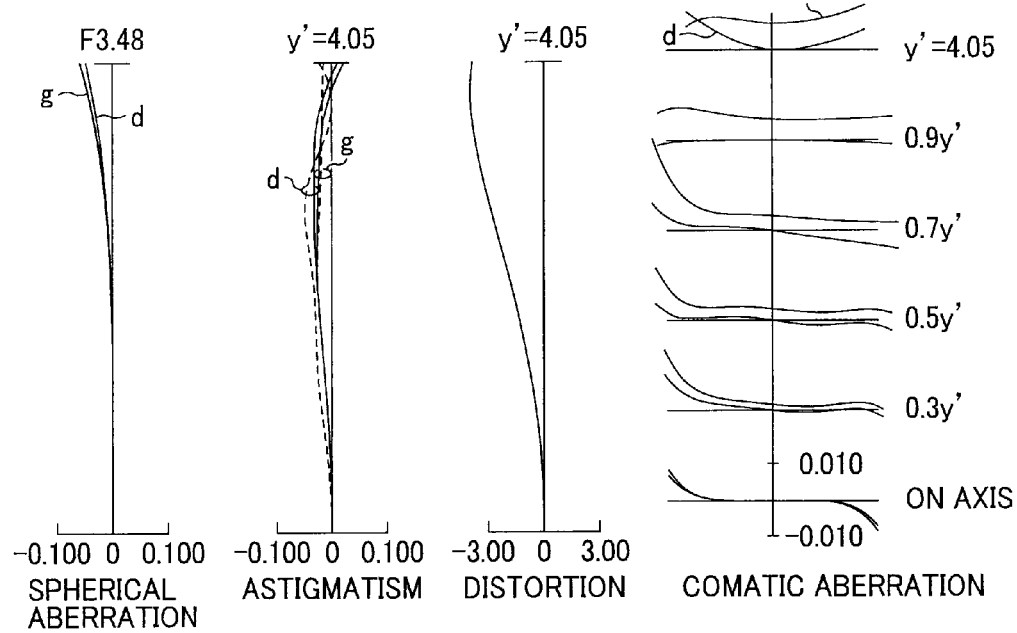
FIG. 6 is a view illustrating aberration diagrams at a short focal length end of the zoom lens unit according to Example 1.
Figure 7:
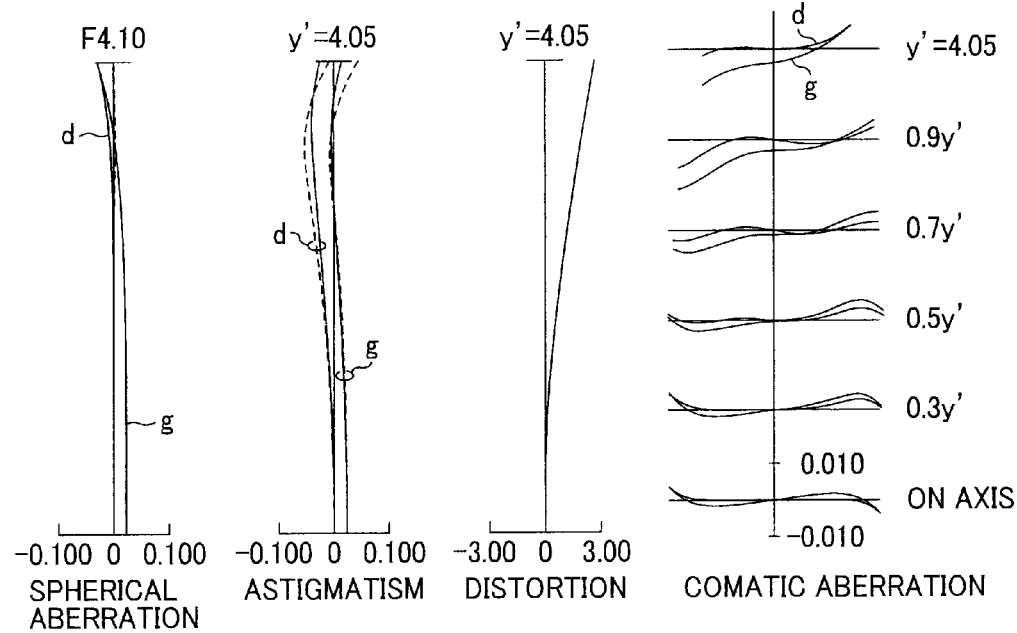
FIG. 7 is a view illustrating aberration diagrams at a position of an intermediate focal length of the zoom lens unit according to Example 1.
Figure 8:
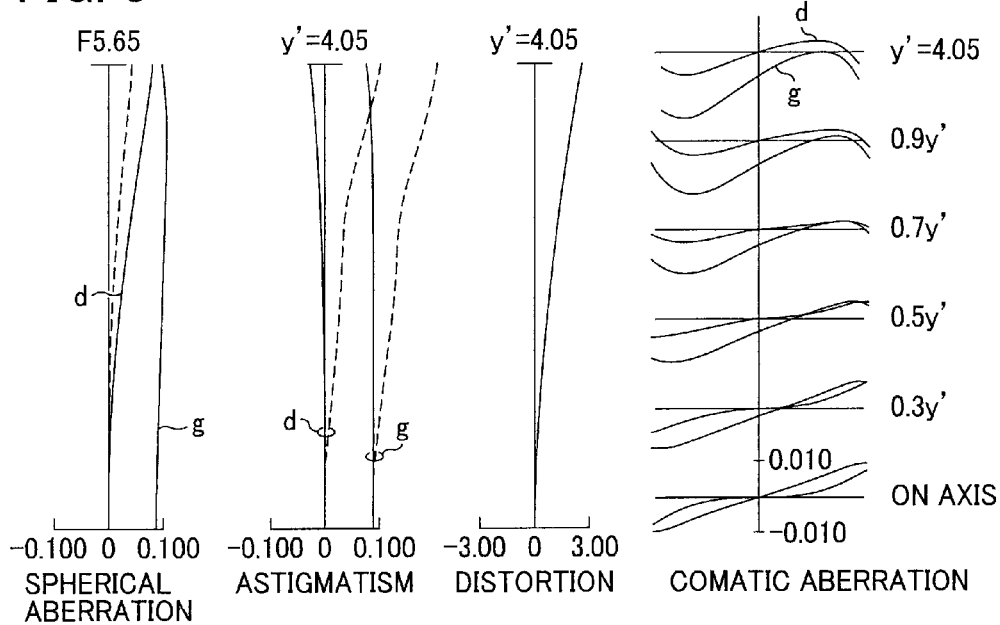
FIG. 8 is a view illustrating aberration diagrams at a long focal length end of the zoom lens unit according to Example 1.
Figure 9:
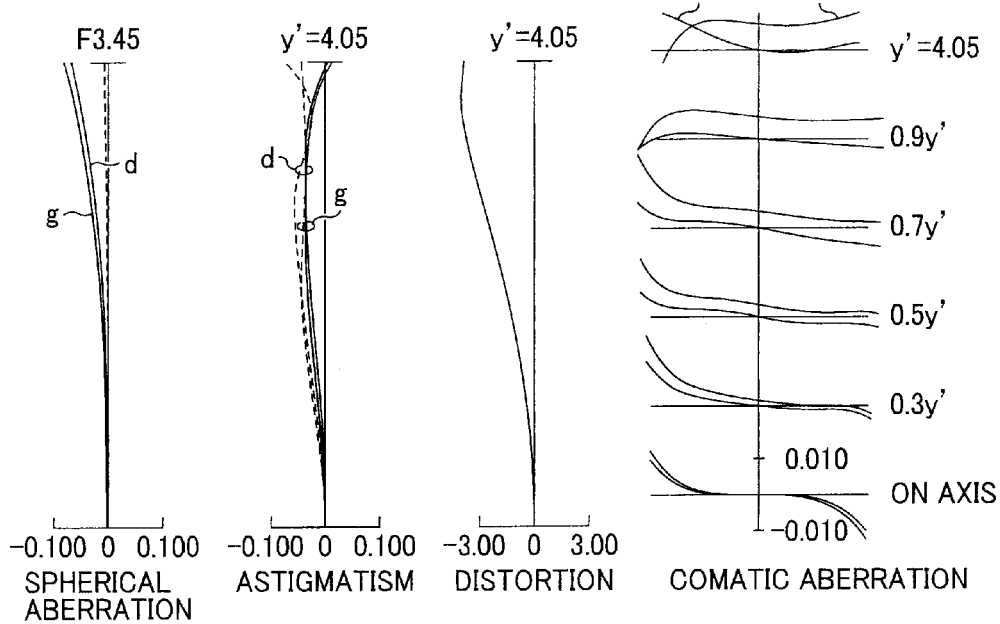
FIG. 9 is a view illustrating aberration diagrams at a short focal length end of the zoom lens unit according to Example 2.
Figure 10:
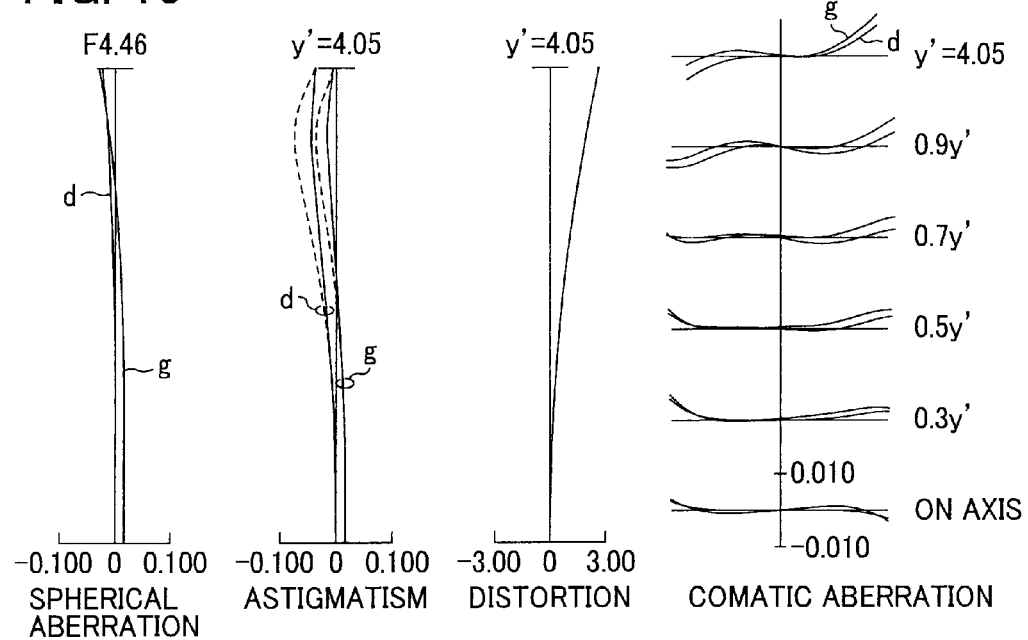
FIG. 10 is a view illustrating aberration diagrams at a position of an intermediate focal length of the zoom lens unit according to Example 2.
Figure 11:
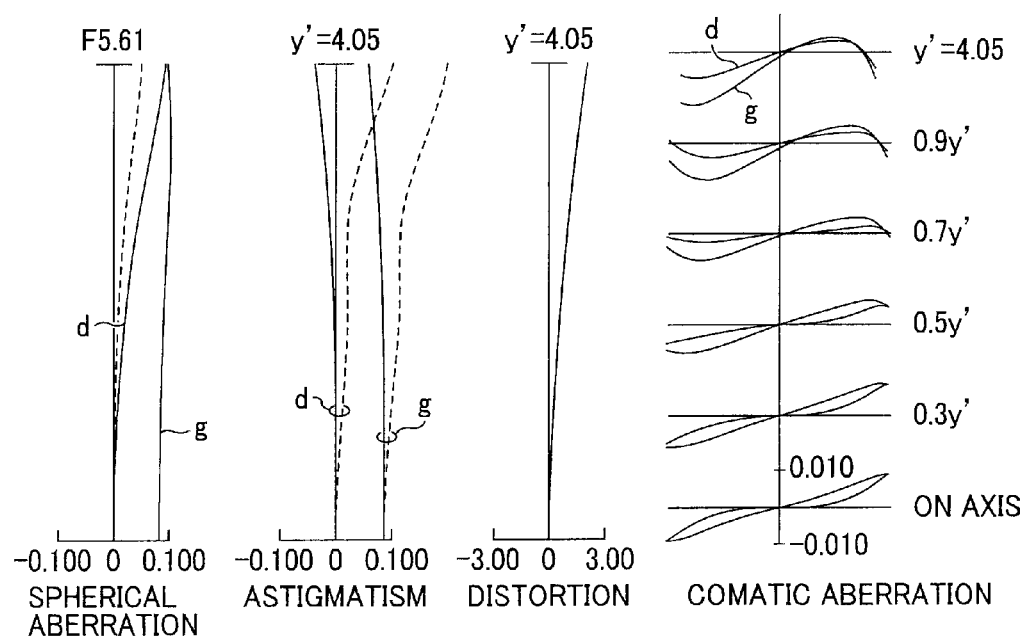
FIG. 11 is a view illustrating aberration diagrams at a long focal length end of the zoom lens unit according to Example 2.
Figure 12:
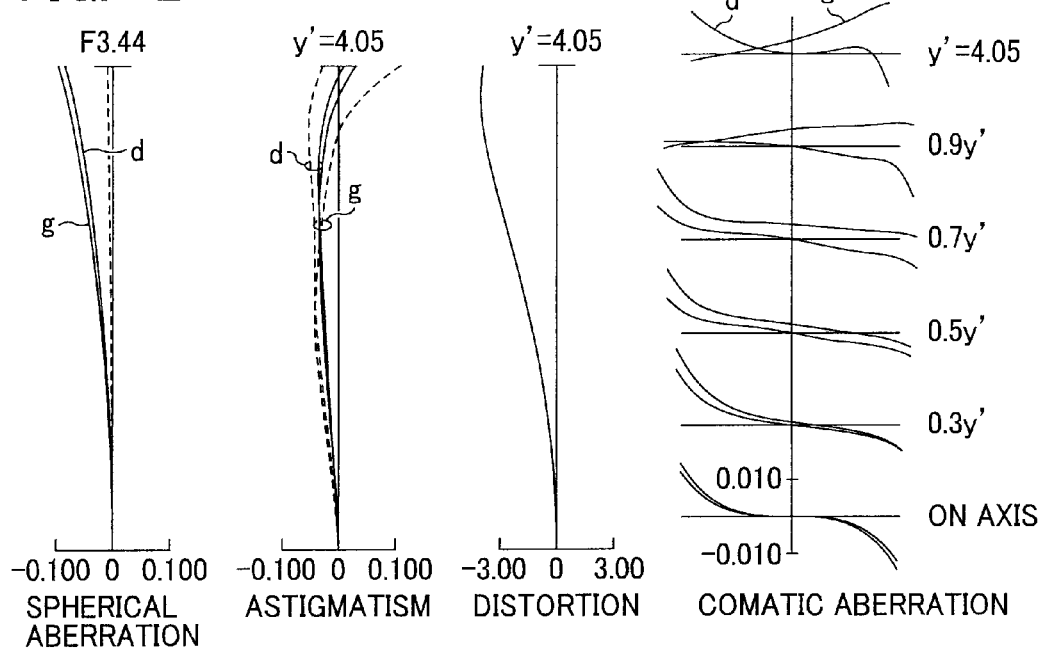
FIG. 12 is a view illustrating aberration diagrams at a short focal length end of the zoom lens unit according to Example 3.
Figure 13:
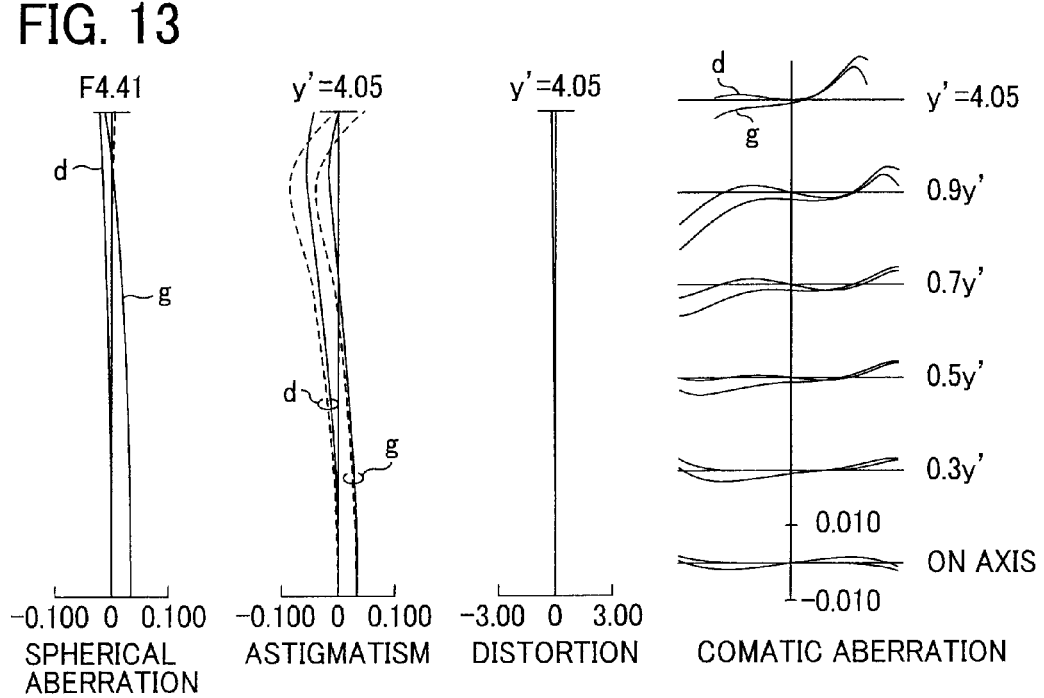
FIG. 13 is a view illustrating aberration diagrams at a position of an intermediate focal length of the zoom lens unit according to Example 3.
Figure 14:
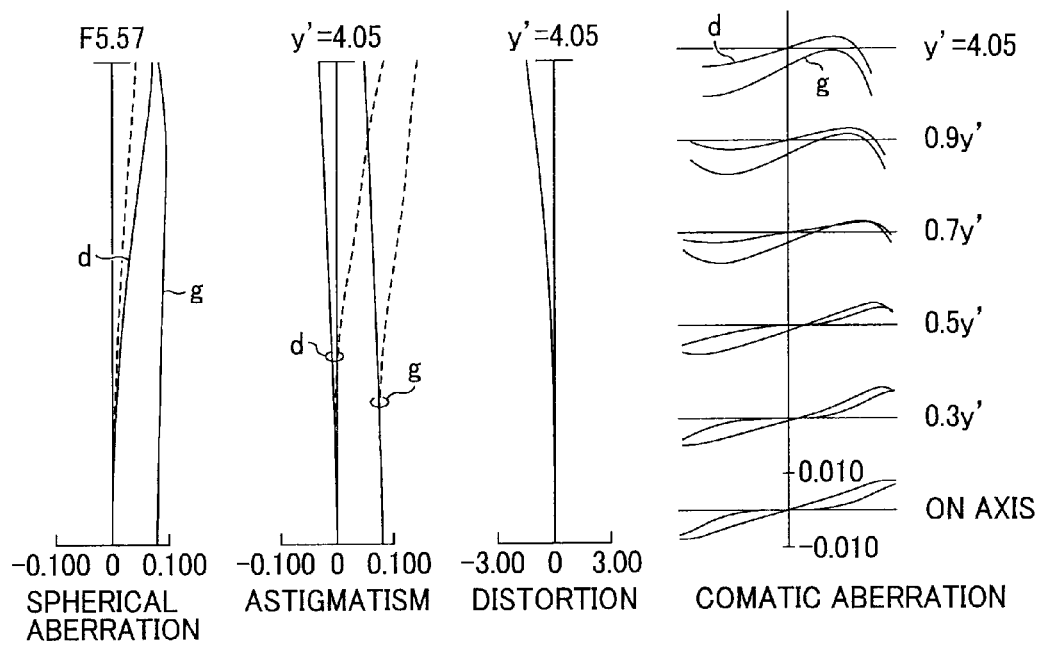
FIG. 14 is a view illustrating aberration diagrams at a long focal length end of the zoom lens unit according to Example 3.
Figure 15:
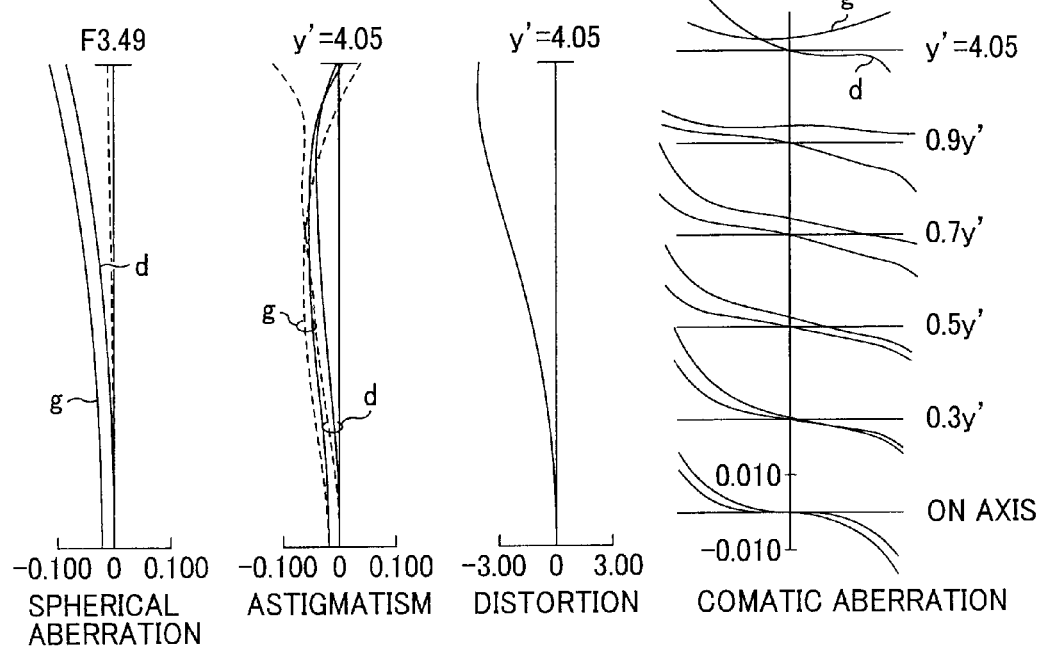
FIG. 15 is a view illustrating aberration diagrams at a short focal length end of the zoom lens unit according to Example 4.
Figure 16:
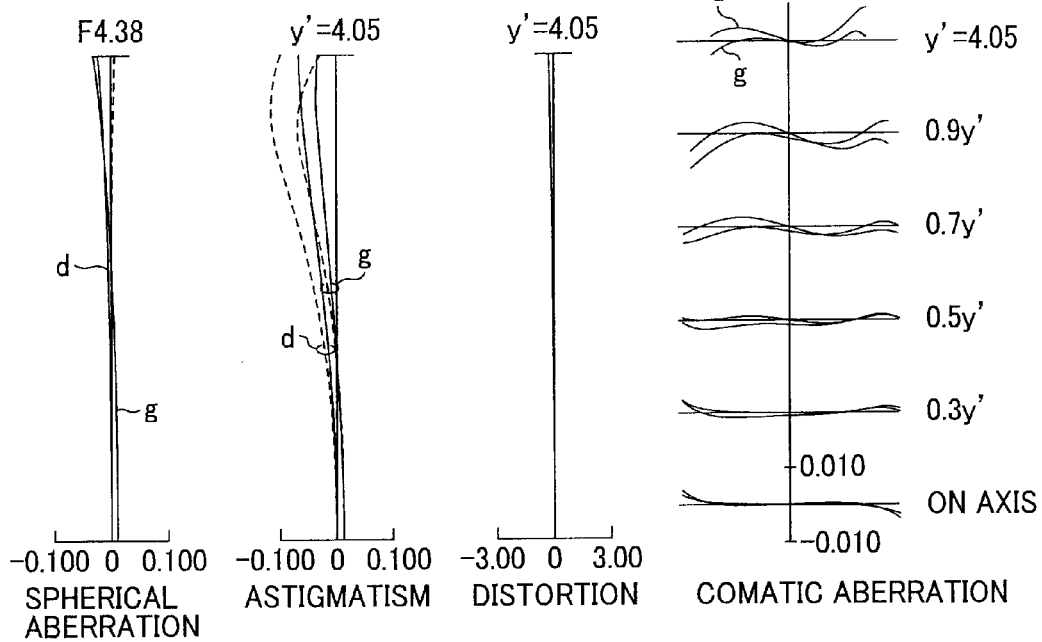
FIG. 16 is a view illustrating aberration diagrams at a position of an intermediate focal length of the zoom lens unit according to Example 4.
Figure 17:
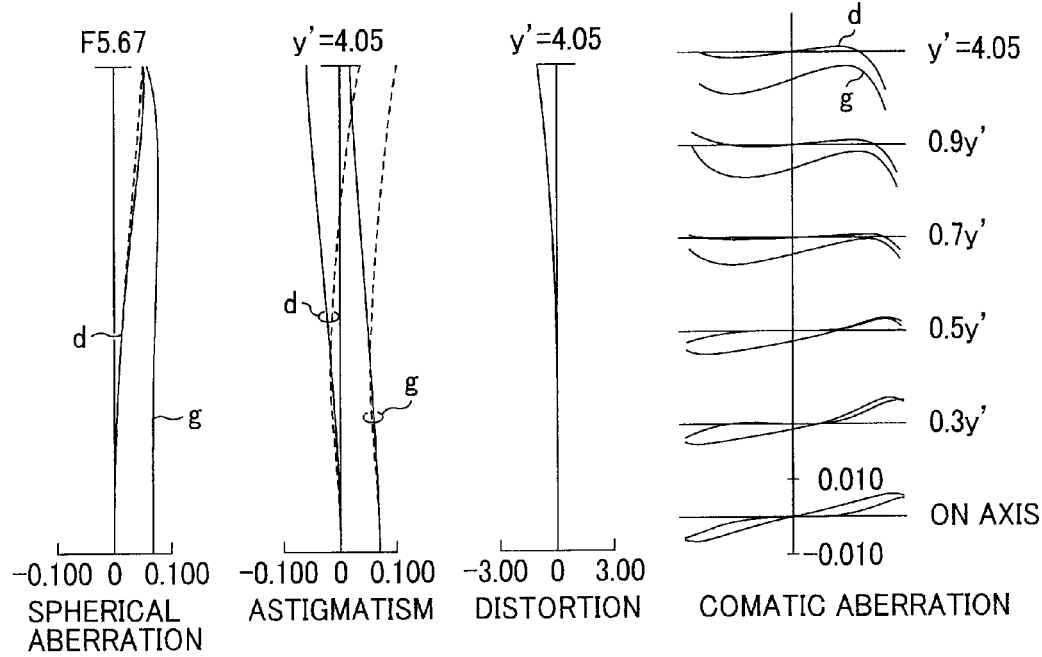
FIG. 17 is a view illustrating aberration diagrams at a long focal length end of the zoom lens unit according to Example 4.
Figure 18:
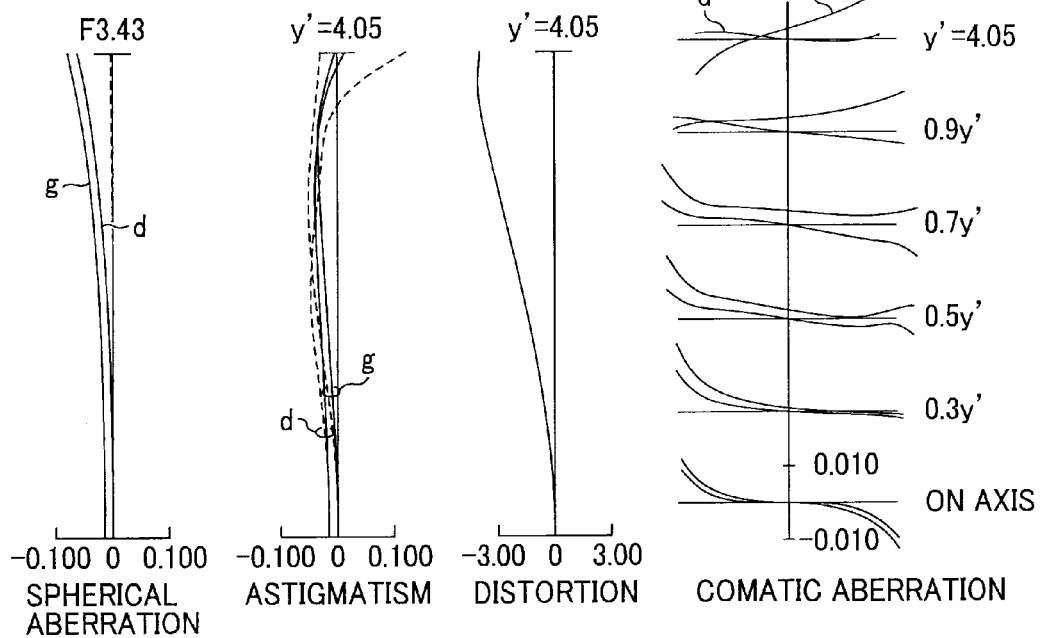
FIG. 18 is a view illustrating aberration diagrams at a short focal length end of the zoom lens unit according to Example 5.
Figure 19:
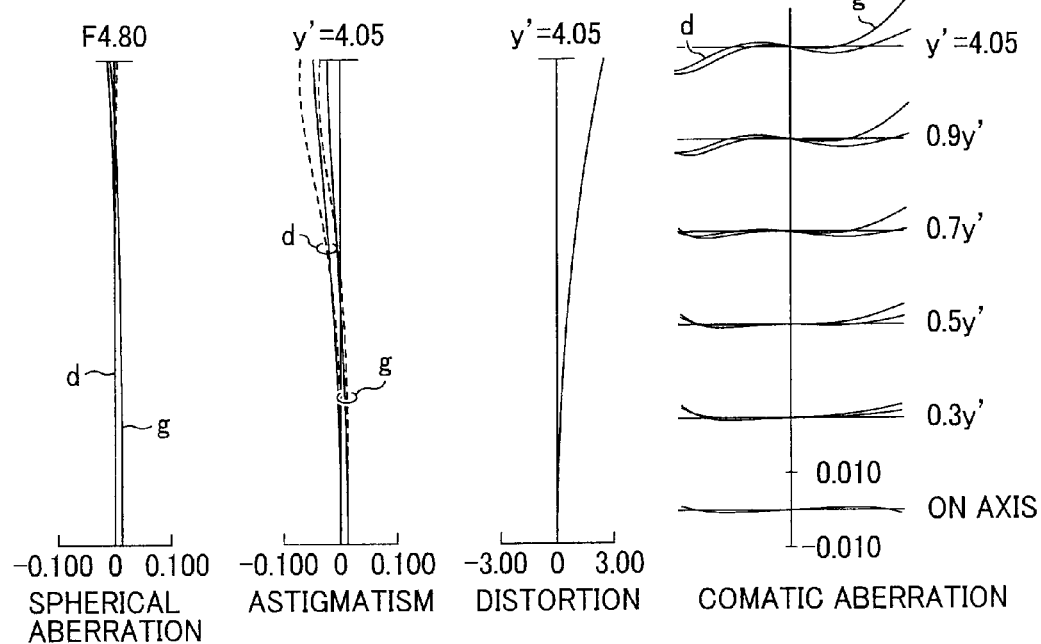
FIG. 19 is a view illustrating aberration diagrams at a position of an intermediate focal length of the zoom lens unit according to Example 5.
Figure 20:
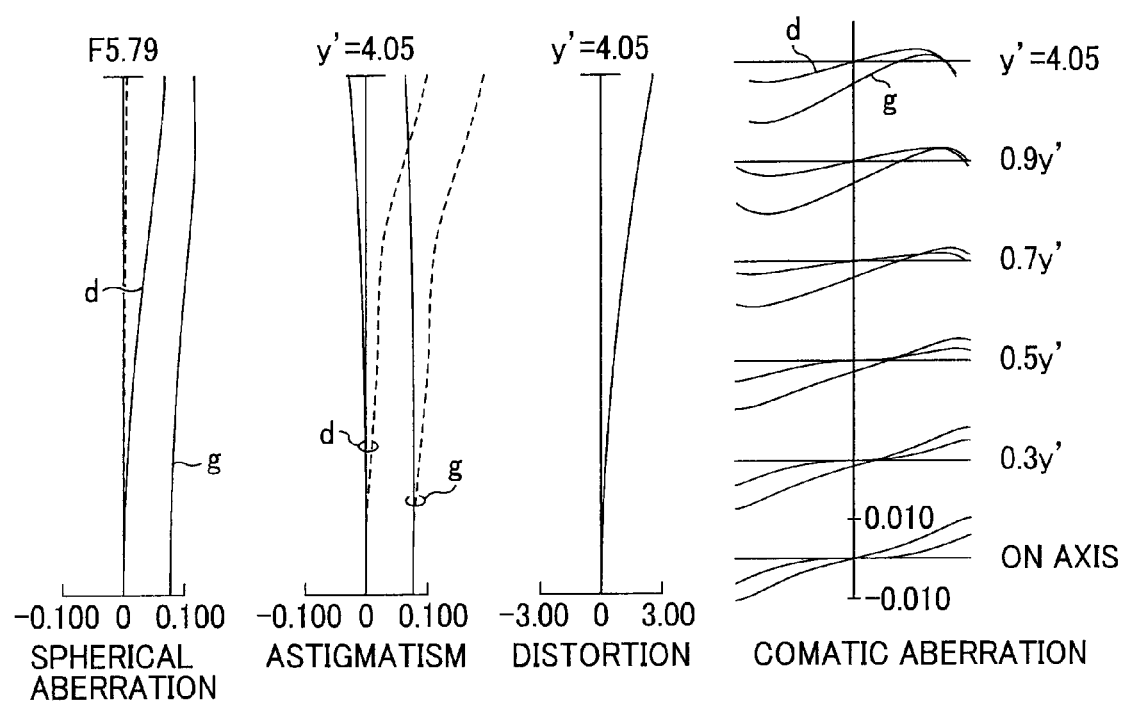
FIG. 20 is a view illustrating aberration diagrams at a long focal length end of the zoom lens unit according to Example 5.

$fap/fW=1.58$ $|r3R|/fW=0.940\times$ $X1/fT=0.336\times$ $X3/fT=0.224$ $|f2|/f3=0.668$ $f1/fW=5.85$ $dSW/fT=0.135$ FIGS. 6-8 illustrate aberration diagrams of the zoom lens unit according to Example 1, at the short focal length end, the intermediate focal length and the long focal length end, respectively. FIGS. 9-11 illustrate aberration diagrams of the zoom lens unit according to Example 2, at the short focal length end, the intermediate focal length and the long focal length end, respectively. FIGS. 2-14 illustrate aberration diagrams of the zoom lens unit according to Example 3, at the short focal length end, the intermediate focal length and the long focal length end, respectively. FIGS. 5-17 illustrate aberration diagrams of the zoom lens unit according to Example 4, at the short focal length end, the intermediate focal length and the long focal length end, respectively. FIGS. 8-20 illustrate aberration diagrams of the zoom lens unit according to Example 5, at the short focal length end, the intermediate focal length and the long focal length end, respectively.

A dashed line in a spherical aberration diagram illustrates a sine condition, a solid line in an astigmatism diagram illustrates sagittal, and a dashed line in the astigmatism diagram illustrates meridional.

In each above-mentioned example, aberrations are corrected sufficiently, and the zoom lens unit is capable of corresponding to the light receiving elements having 10 million to 15 million pixels.

Accordingly, the zoom lens unit, the imaging device, the portable information terminal device and the information device according to embodiments of the present invention at least have the following advantages.

It is possible to provide a compact zoom lens unit, of which a half-field angle at a wide-angle end is 38 degrees or more, and a magnification ratio is 6.5 times or more, and which has a resolution corresponding to an imaging element having 10 million to 15 million pixels, achieved by as few lenses as about 10 lenses.

In addition, higher performance in chromatic aberration or the like can be obtained.

Therefore, an imaging device and a portable information terminal device with high performance in which at least one of the above-mentioned zoom lens units is used as a photographing optical system can be obtained.

It should be noted that although the present invention has been described with respect to exemplary embodiments, the invention is not limited thereto. In view of the foregoing, it is intended that the present invention cover modifications and variations provided they fall within the scope of the following claims and their equivalent.

What is claimed is:

1. A zoom lens unit, comprising in order from an object side to an image side:

a first lens group having a positive refracting power;
a second lens group having a negative refracting power;
a third lens group having a positive refracting power; and
a fourth lens group having a positive refracting power,
an aperture stop being disposed between the second lens group and the third lens group,
and when changing magnification from a wide-angle end to a telephoto end, an interval between the first lens group and the second lens group increases, an interval between the second lens group and the third lens group decreases, and an interval between the third lens group and the fourth lens group increases,
and the first lens group and the third lens group are moved such that the first lens group and the third lens group locate nearer to the object side at the telephoto end than at the wide-angle end,
wherein the third lens group has a positive lens made of an optical glass material which satisfies the following formulae:

$$1.52 < nd < 1.62 \quad (1)$$

$$65.0 < vd < 75.0 \quad (2)$$

$$0.015 < Pg, F - (-0.001802 \times vd + 0.6483) < 0.050 \quad (3)$$

where, nd represents a refractive index of the optical glass material, $v_d$ represents an Abbe number of the optical glass material, and Pg,F represents a partial dispersion ratio of the optical glass material, the partial dispersion ratio, Pg,F, being defined as follows:

$$Pg, F = (ng - nF)/(nF - nC)$$

where, ng, nF and nC represent refractive indexes of the optical glass material for g line, F line and C line, respectively.

2. A zoom lens unit according to claim 1, wherein the following formula is satisfied:

$$30 < FA < 500 \quad (4)$$

where, FA represents a degree of wear of the optical glass material which satisfies the formulae (1) to (3) and forms the positive lens of the third lens group.

3. A zoom lens unit according to claim 1, wherein the following formula is satisfied:

$$1.0 < fap/fW < 2.0 \quad (5)$$

where, fap represents a focal length of the positive lens which is made of the optical glass material satisfying the formulae (1) to (3), of the third lens group, and fW represents a focal length of the entire zoom lens unit system at the wide-angle end.

4. A zoom lens unit according to claim 1, wherein the third lens group has at least two positive lenses and one negative lens, and one of the at least two positive lenses has an aspheric surface, and the positive lens having the aspheric surface is made of an optical glass material which does not satisfy the formulae (1) to (3).

5. A zoom lens unit according to claim 1, wherein the following formula is satisfied:

$$0.20 < X1/fT < 0.45 \quad (7)$$

where, X1 represents a total displacement of the first lens group when changing magnification from the wide-angle end to the telephoto end, and fT represents a focal length of the entire zoom lens unit system at the telephoto end.

6. A zoom lens unit according to claim 1, wherein the following formula is satisfied:

$$0.15 < X3/fT < 0.40 \quad (8)$$

where, X3 represents a total displacement of the third lens group when changing magnification from the wide-angle end to the telephoto end, and fT represents a focal length of the entire zoom lens unit system at the telephoto end.

7. A zoom lens unit according to claim 1, wherein the following formulae are satisfied:

$$0.50 < |f2|/f3 < 0.85 \quad (9)$$

$$5.0 < f1/fW < 8.0 \quad (10)$$

where, f1 represents a focal length of the first lens group, f2 represents a focal length of the second lens group, f3 represents a focal length of the third lens group, and fW represents a focal length of the entire zoom lens unit system at the wide-angle end.

8. An imaging device, including the zoom lens unit according to claim 1 as a photographing optical system.

9. A portable information terminal device, including the zoom lens unit according to claim 1, as a photographing optical system of a camera function part.

10. A zoom lens unit according to claim 1, wherein the third lens group has at least two positive lenses and one negative lens, and one of the at least two positive lenses has an aspheric surface, and the positive lens having the aspheric surface is made of the optical glass material which satisfies the formulae (1) to (3).

11. A zoom lens unit according to claim 10, wherein a negative lens with a concave surface having stronger curvature toward the image side is disposed nearest to the image side of the third lens group, and wherein the following formula is satisfied:

$$0.6 < |r3R|/fW < 1.3 \quad (6)$$

where, r3R represents a curvature radius of the concave surface with stronger curvature on the image side of the negative lens, and fW represents a focal length of the entire zoom lens unit system at the wide-angle end.

12. A zoom lens unit, comprising in order from an object side to an image side:

a first lens group having a positive refracting power;
a second lens group having a negative refracting power;
a third lens group having a positive refracting power; and
a fourth lens group having a positive refracting power,
and when changing magnification from a wide-angle end to a telephoto end, an interval between the first lens group and the second lens group increases, an interval between the second lens group and the third lens group decreases, and an interval between the third lens group and the fourth lens group increases,
and the first lens group and the third lens group are moved such that the first lens group and the third lens group locate nearer to the object side at the telephoto end than at the wide-angle end,
wherein an aperture stop is disposed between the second lens group and the third lens group, and
wherein the first lens group has a positive lens made of an optical glass material, and the positive lens of the first lens group satisfies the following formulae:

$$1.52 < nd < 1.62 \quad (21)$$

$$65.0 < vd < 75.0 \quad (22)$$

$$0.015 < Pg,F - (-0.001802 \times vd + 0.6483) < 0.050 \quad (23)$$

where, nd represents a refractive index of the optical glass material forming the positive lens, $v_d$ represents an Abbe number of the optical glass material forming the positive lens, and Pg,F represents a partial dispersion ratio of the optical glass material forming the positive lens, the partial dispersion ratio, Pg,F, being defined as follows:

$$Pg,F = (ng - nF)/(nF - nC)$$

where, ng, nF and nC represent refractive indexes of the optical glass material forming the positive lens for g line, F line and C line, respectively.

13. A zoom lens unit according to claim 12, wherein the following formula is satisfied:

$$30 < FA < 500 \quad (24)$$

where, FA represents a degree of wear of the optical glass material which forms the positive lens satisfying the formulae (21) to (23), of the first lens group.

14. A zoom lens unit according to claim 12, wherein the following formula is satisfied:

$$5.0 < fap/fW < 15.0 \quad (25)$$

where, fap represents a focal length of the positive lens which is made of the optical glass material and which satisfies the formulae (21) to (23), of the first lens group, and fW represents a focal length of the entire zoom lens unit system at the wide-angle end.

15. A zoom lens unit according to claim 12, wherein at least one of positive lenses of the first lens group has an aspheric surface, and the positive lens having the aspheric surface satisfies the formulae (21) to (23).

16. A zoom lens unit according to claim 12, wherein the first lens group has two positive lenses.

17. A zoom lens unit according to claim 12, wherein a negative lens with a stronger concave surface toward the image side is disposed nearest to the image side of the third lens group, and wherein the following formula is satisfied:

$$0.6 < |r3R|/fW < 1.3 \quad (26)$$

where, r3R represents a curvature radius of the surface nearest to the image side of the third lens group, and fW represents a focal length of the entire zoom lens unit system at the wide-angle end.

18. A zoom lens unit according to claim 12, wherein the following formula is satisfied:

$$0.20 < X1/fT < 0.45 \quad (27)$$

where, X1 represents a total displacement of the first lens group when changing magnification from the wide-angle end to the telephoto end, and fT represents a focal length of the entire zoom lens unit system at the telephoto end.

19. A zoom lens unit according to claim 12, wherein the following formula is satisfied:

$$0.15 < X3/fT < 0.40 \quad (28)$$

where, X3 represents a total displacement of the third lens group when changing magnification from the wide-angle end to the telephoto end, and fT represents a focal length of the entire zoom lens unit system at the telephoto end.

20. A zoom lens unit according to claim 12, wherein the following formulae are satisfied:

$$0.50 < |f2|/f3 < 0.85 \quad (29)$$

$$5.0 < f1/fW < 8.0 \quad (30)$$

where, f1 represents a focal length of the first lens group, f2 represents a focal length of the second lens group, f3 represents a focal length of the third lens group, and fW represents a focal length of the entire zoom lens unit system at the wide-angle end.

* * * * *